(12) United States Patent
Kajimoto

(10) Patent No.: US 6,938,269 B2
(45) Date of Patent: Aug. 30, 2005

(54) VIDEO FILE PROVIDING APPARATUS, VIDEO RECEIVING/REPRODUCING APPARATUS, INTERNET BROADCAST SYSTEM, AND COMPUTER-READABLE RECORDING MEDIUM

(75) Inventor: Kazuo Kajimoto, Neyagawa (JP)

(73) Assignee: Matsushita Electric Industrial Co., LTD, Osaka (JP)

( * ) Notice: Subject to any disclaimer, the term of this patent is extended or adjusted under 35 U.S.C. 154(b) by 886 days.

(21) Appl. No.: 09/726,405

(22) Filed: Dec. 1, 2000

(65) Prior Publication Data

US 2001/0003195 A1 Jun. 7, 2001

(30) Foreign Application Priority Data

Dec. 2, 1999 (JP) ............................................ 11-343058

(51) Int. Cl.[7] ......................... H04N 7/173; G06F 15/16; G06F 7/00; G06F 17/00
(52) U.S. Cl. ......................... 725/93; 725/100; 709/217; 707/104.1
(58) Field of Search ............................ 725/86, 92, 105, 725/109, 110; 707/104.1; 386/125, 126; 709/217

(56) References Cited

U.S. PATENT DOCUMENTS

| | | | | |
|---|---|---|---|---|
| 5,764,893 A | * | 6/1998 | Okamoto et al. ............ 709/231 |
| 5,854,887 A | * | 12/1998 | Kindell et al. ................. 725/86 |
| 5,913,039 A | * | 6/1999 | Nakamura et al. ........... 709/231 |
| 5,930,493 A | * | 7/1999 | Ottesen et al. ................ 725/92 |
| 5,956,716 A | * | 9/1999 | Kenner et al. ................ 707/10 |
| 6,005,599 A | * | 12/1999 | Asai et al. ................... 725/116 |
| 6,763,496 B1 | * | 7/2004 | Hennings et al. ......... 715/501.1 |
| 2001/0011301 A1 | * | 8/2001 | Sato et al. .................. 709/219 |

* cited by examiner

Primary Examiner—Andrew Faile
Assistant Examiner—Joseph G. Ustaris
(74) Attorney, Agent, or Firm—Wenderoth, Lind & Ponack, L.L.P.

(57) ABSTRACT

An Internet broadcast system includes a video file providing apparatus and a video receiving/reproducing apparatus that are connected via the Internet. The providing apparatus includes a storing unit for storing a video file consecutively storing a plurality of sets of sectional video data. The receiving/reproducing apparatus stores a plurality of video reproduction tables specifying sets of sectional video data in an order of reproduction. A viewer designates one of the video reproduction tables. An information processing unit in the receiving/reproducing apparatus generates a transfer instruction for each set of sectional video data specified in the designated table, and transmits the generated instruction to the providing apparatus. Upon receiving the instruction, the providing apparatus reads a set of sectional video data from the video file, and transmits the read set to the receiving/reproducing apparatus. The receiving/reproducing apparatus outputs and reproduces each received set of sectional video data in the reproduction order.

3 Claims, 22 Drawing Sheets

FIG. 3

VIDEO REPRODUCTION TABLE 301

| CLOSE-UP VIEW OF XXXX 302 | | | | |
|---|---|---|---|---|
| REPRODUCING ORDER | SITE NAME | VIDEO FILE NAME | READ-START FRAME NUMBER | NUMBER OF READING FRAMES |
| 1 | SITE 1 | FILE 5 | 1800 | 300 |
| 2 | SITE 2 | FILE 6 | 600 | 900 |
| 303 | 304 | 305 | 306 | 307 |

FIG. 7

VIDEO REPRODUCTION TABLE

| REPRODUCING ORDER | SITE NAME | VIDEO FILE NAME | READ-START FRAME NUMBER | NUMBER OF READING FRAMES |
|---|---|---|---|---|
| 1 | SITE 1 | FILE 5 | 1800 | 300 |
| 2 | LOCAL | FILE 6 | 600 | 900 |

FIG. 15

```
                                              ─1501
⟨?AVXML version="1.0"?⟩ ─1502
⟨!DOCTYPE videoprogram [⟩─1503
⟨!VIDEOCUTLIST VIDEO1 self "Osaka, raining"  ─1505
in=00:00:30:00 out=00:01:30:00⟩
⟨!VIDEOCUTLIST VIDEO2 external "avxml://www.x.com/live from Tokyo"
in=00:01:00:00 out=00:03:00:00⟩            ─1506
⟨!VIDEOCUTLIST VIDEO3 local "D:/news repeat"─1507
in=00:00:00:00 out=00:02:00:00⟩
]⟩ ─1504
                 ─1508
⟨videoprogram⟩
⟨title="today's weather forecast"⟩ ─1510
⟨duration=00:05:00:00⟩─1511
⟨VIDEO REPRODUCTION TABLE⟩─1512
⟨videocut⟩─1514
&VIDEO1 ─1520
⟨/videocut⟩─1515
⟨videocut⟩─1516
&VIDEO2─1521
⟨/videocut⟩─1517
⟨videocut⟩─1518
&VIDEO3─1522
⟨/videocut⟩─1519
⟨/VIDEO REPRODUCTION TABLE⟩─1513
⟨video data sequence⟩─1523
⟨videotitle= "Osaka, raining"⟩─1525
⟨videoduration=00:02:00:00⟩─1526
⟨videoin=00:00:00:00⟩─1527
⟨videoout=00:02:00:00⟩─1528
⟨videoformat="JPEG Interchange Format"⟩─1529
⟨videocontents⟩─1530
┌────────────────┐
│VIDEO BINARY DATA│─1532
└────────────────┘
⟨/videocontents⟩─1531
⟨/video data sequence⟩─1524
⟨/videoprogram⟩─1509
```

FIG. 16

VIDEO REPRODUCTION TABLE
1601

| TODAY'S WEATHER FORECAST | | | | |
|---|---|---|---|---|
| REPRODUCING ORDER | SITE NAME | FILE NAME | START TIME CODE | END TIME CODE |
| | | | 1602 | 1603 |
| 1 | www.y.com | ePackage.xml | 00:00:30:00 | 00:01:30:00 |
| 2 | www.x.com | LIVE FROM TOKYO | 00:01:00:00 | 00:03:00:00 |
| 3 | [local] | NEWS REPEAT | 00:00:00:00 | 00:02:00:00 |

FIG. 21

VIDEO REPRODUCTION TABLE 2101

2110 — REPRODUCTION FEE = 200 YEN
2111 — TOOL MANUFACTURER ID = XXXXX ELECTRIC INDUSTRIAL CO., LTD.
2112 — TOOL MANUFACTURER SHARE RATE = 20 %

2102 — VIDEO IMAGE NAME

| REPRODUCING ORDER | SITE NAME | DATA SEQUENCE NAME | REPRODUCTION START TIME CODE | REPRODUCTION DURATION TIME CODE | ENCRYPTED DATA KEY |
|---|---|---|---|---|---|
| 1 | WITHIN ITS OWN FILE | DATA 1 | 00:30:00:00 | 00:30:00:00 | hkdfhdsfns |
| 2 | WITHIN ITS OWN FILE | DATA 2 | 01:00:20:00 | 00:40:00:00 | Njdkvmkfd: |

2103   2105   2106   2107   2108   2109

2104 REPRODUCTION INFORMATION

VIDEO FILE PROVIDING APPARATUS, VIDEO RECEIVING/REPRODUCING APPARATUS, INTERNET BROADCAST SYSTEM, AND COMPUTER-READABLE RECORDING MEDIUM

BACKGROUND OF THE INVENTION (1) Field of the Invention

The present invention relates to an Internet broadcast system.

(2) Description of the Related Art

FIG. 1 shows a construction of a conventional Internet broadcast system that obtains video data via the Internet and reproduces the obtained video data.

The conventional Internet broadcast system comprises a video file providing apparatus 101 which is achieved by a Web site and a video receiving/reproducing apparatus 102, which are connected to each other via the Internet 103.

The video file providing apparatus 101 includes the following elements: a video file storing unit 105 for storing a plurality of video files 104; a video data reading unit 106 for reading video data from the video file storing unit 105; a video data transmitting (sending) unit 107 for transmitting the read video data via the Internet 103 to the video receiving/reproducing apparatus 102; and a transfer instruction receiving unit 108 for receiving a transfer instruction to have video data transferred and sending the received transfer instruction to the video data reading unit 106.

The video receiving/reproducing apparatus 102 includes the following elements: a transfer instruction generating unit 109 for generating a transfer instruction to have desired video data transferred; a transfer instruction transmitting unit 110 for transmitting the transfer instruction via the Internet 103 to the video file providing apparatus 101; a video data receiving unit 111 for receiving video data that is sent from the video file providing apparatus 101; and a video data reproducing unit 112 for reproducing and outputting the received video data.

With reference to FIG. 1 a procedure will now be described that is taken when a viewer watches video.

The viewer first specifies video data he wishes to watch by selecting a name of the video data from a menu which is displayed on a screen or the like. The transfer instruction generating unit 109 then generates, for the specified video data, a transfer instruction that is directed to the video file providing apparatus 101, which includes the video file storing unit 105 storing a video file that is identified by the selected name of the video data.

The transfer instruction transmitting unit 110 transmits the generated transfer instruction via the Internet 103 to the video file providing apparatus 101.

The transfer instruction receiving unit 108 receives this transfer instruction, and sends the transfer instruction to the video data reading unit 106. This transfer instruction contains a video file name, which identifies a name of the specified video data, and an address of the video receiving/reproducing apparatus 102 from which the transfer instruction has been sent.

In accordance with the transfer instruction that is sent from the transfer instruction receiving unit 108, the video data reading unit 106 reads video data from a video file, which is specified by the video file name that is written in the transfer instruction and stored in the video file storing unit 105. The video data reading unit 106 then sends the read video data and the address of the video receiving/reproducing apparatus 102 to the video data transmitting unit 107.

Following this, the video data transmitting unit 107 transmits the video data that is directed to the video receiving/reproducing apparatus 102 via the Internet 103.

The video data receiving unit 111 in the video receiving/reproducing apparatus 102 receives the transmitted video data, and sends the received video data to the video data reproducing unit 112.

The video data reproducing unit 112 reproduces and outputs the sent video data.

As a result, the viewer can watch all of the video data stored in the video file which is identified by the selected name in the video file providing apparatus 101.

When video data in each of the video files 104 is composed of two sets of sectional video data that are joined in sequence, for instance, "video data 1 " and "video data 2", the viewer watches video images that change from "sectional video data 1" to "sectional video data 2" as such images are reproduced by the video data reproducing unit 112.

If the viewer wishes to watch video images that make a reverse change from "sectional video data 2" to "sectional video data 1", however, the viewer first has to record the above-described video data that is outputted by the video data reproducing unit 112, and then clip and edit the two sets of sectional video data. Alternatively, it is necessary to have the video file storing unit 105 additionally store a video file storing video data in which "sectional video data 2" and "sectional video data 1 " are arranged consecutively in this order.

The above editing, however, is not a realistic approach to obtain such video data since it requires an editing device and is also time-consuming for the viewer. Having the video file providing apparatus 101 additionally store video files is also not realistic in view of the fact that a single video file requires a large-capacity memory.

SUMMARY OF THE INVENTION

In view of the above-described problems, the present invention aims, as the first object, to provide a video file providing apparatus, a video receiving/reproducing apparatus, and an Internet broadcast system comprising the video file providing apparatus and the video receiving/reproducing apparatus, with which a viewer can watch a variety of desired video images, which are composed of the same combination of sets of sectional video data that are arranged in different reproducing orders, without the viewer needing to edit sets of sectional video data, or the video file providing apparatus needing to store a great number of video files which only store the same combination of sets of sectional video data in different reproducing orders.

The second object of the present invention is to provide a video receiving/reproducing apparatus that allows a producer of a video file to collect a fee for a watching (viewing) of video data.

The third object of the present invention is to provide an apparatus that can distribute a part of the collected fee as a share to a manufacturer of an authoring tool which is used by the video file producer to produce a video file.

The first object can be achieved by a video file providing apparatus which is connected to a plurality of video receiving/reproducing apparatuses via the Internet, and which is accessed by each video receiving/reproducing apparatus via a Web site name. This video file providing apparatus includes: a video file storing unit operable to store a video file that consecutively stores a plurality of sets of sectional video data, where each set of sectional video data is composed of frames; a receiving unit operable to receive a request for a set of sectional video data from each video receiving/reproducing apparatus, where the request specifies the video file and a section in the specified video file which store the set of sectional video data; a reading unit operable to analyze the received request and read the set of sectional video data from the specified section in units of frames; and a transmitting unit operable to transmit the read set of sectional video data via the Internet to the video receiving/reproducing apparatus that has made the request.

This construction allows the reading unit of the video file providing apparatus to read only sets of sectional video data that have been requested via the receiving unit instead of reading a whole video file. Accordingly, the video file storing unit does not need to store a great number of video files which each store the same combination of sets of sectional video data that are arranged in a different order. This can provide a variety of video images to viewers who have a video receiving/reproducing apparatuses without the video file storing unit needing to have a huge storage capacity.

The first object can be also achieved by a video file providing apparatus which is connected to a plurality of video receiving/reproducing apparatuses via the Internet, and which includes a video file storing device and a table storing device that are accessed by each video receiving/reproducing apparatus via a Web site name. The video file storing device includes: a video file storing unit operable to store a video file that consecutively stores a plurality of sets of sectional video data, where each set of sectional video data is composed of frames; a receiving unit operable to receive a request for a set of sectional video data from each video receiving/reproducing apparatus, where the request specifies the video file and a section in the specified video file which store the set of sectional video data; a reading unit operable to analyze the received request and to read the set of sectional video data from the specified section in units of frames; and a transmitting unit operable to transmit the read set of sectional video data via the Internet to the video receiving/reproducing apparatus that has made the request. The table storing device includes: a table storing unit operable to store a plurality of video reproduction tables which each contain reproduction information specifying at least one set of sectional video data in an order of reproduction of each set of sectional video data; a table request receiving unit operable to receive a table request from each video receiving/reproducing apparatus via the Internet, where the table request specifies a video reproduction table in the table storing unit; a table reading unit operable to read the specified video reproduction table; and a table transmitting unit operable to transmit the read video reproduction table via the Internet to the video receiving/reproducing apparatus that has made the table request.

With this construction, not all of the video receiving/reproducing apparatuses have to store video reproduction tables. At the same time, a variety of video images can be provided to viewers who have a video receiving/reproducing apparatus, without the video file storing unit needing to have a huge storage capacity.

The first object can be also achieved by a video file providing apparatus which is connected to a plurality of video receiving/reproducing apparatuses via the Internet, and which is accessed by each video receiving/reproducing apparatus via a Web site name. This video file providing apparatus includes: a mixed file storing unit operable to store at least one mixed file storing (a) a video data sequence which contains a plurality of sets of sectional video data that are arranged consecutively, and (b) a plurality of video reproduction tables which each contain reproduction information specifying at least one set of sectional video data in an order of reproduction of each set of sectional video data, where each set of sectional video data is composed of frames; a table reading unit operable to analyze a mixed file in the mixed file storing unit and to read a video reproduction table from the analyzed mixed file; a video request receiving unit operable to receive a request for a set of sectional video data from each video receiving/reproducing apparatus via the Internet, where the request specifies a mixed file, a video data sequence in the specified mixed file, and a section which is in the specified mixed file, and to store the set of sectional video data; a video reading unit operable to analyze the mixed file that is specified by the received request, and to read the set of sectional video data from the specified section in units of frames; a table transmitting unit operable to transmit the read video reproduction table via the Internet; and a video transmitting unit operable to transmit the read set of sectional video data via the Internet to the video receiving/reproducing apparatus that has made the request.

For this construction, video reproduction tables and a video data sequence can be stored in the same file. This facilitates file management and allows the viewer to watch a variety of video images without the capacity of the mixed file storing unit having to be increased.

Here, the above-described video file providing apparatus may further include a table request receiving unit operable to receive a table request for a video reproduction table in the mixed file storing unit from each video receiving/reproducing apparatus via the Internet. In accordance with the received table request, the table reading unit may read the video reproduction table.

For this construction, a viewer can transmit a request for a video reproduction table to a video file providing apparatus, and therefore, the video receiving/reproducing apparatus does not need to store any video reproduction tables.

Here, the table transmitting unit may transmit the read video reproduction table to each video receiving/reproducing apparatus at predetermined intervals over a predetermined period.

For this construction, a viewer can receive a video reproduction table via a video receiving/reproducing apparatus from the video file providing apparatus. When receiving a desired video reproduction table, the viewer can request video data that is specified in the received video reproduction table and watch the requested video data.

The first object can be also achieved by a video receiving/reproducing apparatus that is connected via the Internet to at least one video file providing apparatus, which is accessed via a site name, stores a video file consecutively storing a plurality of sets of sectional video data, reads a set of sectional video data that has been requested, and transmits the read set of sectional video data via the Internet. The video receiving/reproducing apparatus includes: a table storing unit operable to store a plurality of video reproduction tables which each contain reproduction information that specifies at least one set of sectional video data in an order of reproduction of each set of sectional video data; a table designation receiving unit operable to receive a designation of a video reproduction table that is stored in the table storing unit; a table reading unit operable to read the designated video reproduction table from the table storing unit; a requesting unit operable to transmit via the Internet, in accordance with reproduction information in the read video reproduction table, a request for each set of sectional video data to a video file providing apparatus storing the set of sectional video data, where the requesting unit transmits the request in an order of reproduction that is shown in the reproduction information; a receiving unit operable to receive each set of sectional video data from a video file providing apparatus to which a request has been transmitted; and a video data reproducing unit operable to output and reproduce each received set of sectional video data in the order of reproduction.

For this construction, the viewer can specify and watch desired video data by designating a video reproduction table in which sets of sectional video data are specified in a certain reproducing order. The viewer can therefore watch a variety of reproduction results of sets of sectional video data without needing to edit the video data by himself.

Here, for each set of sectional video data, the reproduction information may show (a) a location of a section, using frame units, the section storing the set of sectional video data, (b) a name of a video file where the section exists, and (c) a Web site name of a video file providing apparatus containing the video file. The requesting unit may use the section and the name of the video file so as to specify the set of sectional video data, and transmit the request to the Web site name that is shown in the reproduction information.

For this construction, sectional video data can be precisely specified. As a result, even when sectional video data is part of video data in a video file, this sectional video data can be precisely specified so as to be obtained.

Here, the above-described video file receiving/reproducing apparatus may further include: a local video file storing, unit operable to store a video file consecutively storing a plurality of sets of sectional video data, where each set of sectional video data, is composed of frames. The reproduction information may specify each set of sectional video data that is stored in a video file which is contained in either a video file providing apparatus or the local video file storing unit, and show, for a set of sectional video data that is stored in the local video file storing unit, a Web site name that is not a name of any video file providing apparatus. The video file receiving/reproducing apparatus may also further include: a source judging unit operable to judge from the video reproduction table that is read by the table reading unit whether each set of sectional video data in the video reproduction table is stored in either a video file providing apparatus or the local video file storing unit, and a local video file reading unit operable to prohibit the requesting unit from transmitting a request when a set of sectional video data is judged to be stored in the local video file storing unit, and then read the judged set of sectional video data from the local video file storing unit. The video data reproducing unit may output and reproduce, in the order of reproduction, each set of sectional video data that is read from the local video file reading unit, and each received set of sectional video data.

For this construction, the viewer can watch a reproduction result of a combination of: (a) video data that is stored in a video file of the video receiving/reproducing apparatus; and (b) video data that is stored in a video file in a Web site.

The first object can be also achieved by a video receiving/reproducing apparatus which is connected via the Internet to at least one video file providing apparatus including a video file storing device and a table storing device. The video file storing device is accessed via a Web site name, stores a video file consecutively storing a plurality of sets of sectional video data, reads a set of sectional video data which has been requested, and transmits the read set of sectional video data via the Internet. The table storing device is accessed via the Web site name, stores a plurality of video reproduction tables which each contain reproduction information specifying at least one set of sectional video data in an order of reproduction, reads a video reproduction table which has been requested, and transmits the read video reproduction table via the Internet. The video receiving/reproducing apparatus includes: a table request receiving unit operable to receive a first request for a video reproduction table that is stored in the table storing device; a table requesting unit operable to transmit a second request for the video reproduction table, for which the first request has been made, to the table storing device via the Internet; a table receiving unit operable to receive the video reproduction table from the table storing device via the Internet; a video requesting unit operable to transmit, in accordance with reproduction information that is contained in the received video reproduction table, a third request for each set of sectional video data to the video file storing device via the Internet in an order of reproduction that is shown in the reproduction information; a video receiving unit operable to receive each set of sectional video data from a video file providing apparatus to which a third request has been made; and a video data reproducing unit operable to output and reproduce each received set of sectional video data in the order of reproduction.

The first object can be also achieved by a video receiving/reproducing apparatus which is connected to at least one video file providing apparatus via the Internet. Each video file providing apparatus: (1) stores a mixed file which stores a video data sequence containing a plurality of sets of sectional video data that are arranged consecutively, and a plurality of video reproduction tables which each contain reproduction information specifying at least one set of sectional video data in an order of reproduction of each set of sectional video data; (2) reads, from the mixed file, a video reproduction table and a set of sectional video data which has been requested; and (3) transmits the read video reproduction table and set of sectional video data via the Internet. The video receiving/reproducing apparatus includes: a table receiving unit operable to receive a video reproduction table from a video file providing apparatus via the Internet; a requesting unit operable to transmit, in accordance with reproduction information that is contained in the received video reproduction table, a request for each set of sectional video data to a video file providing apparatus storing the set of sectional video data via the Internet, where the requesting unit transmits the request in an order of reproduction that is shown in the reproduction information; a receiving unit operable to receive each set of sectional video data from a video file providing apparatus to which a request has been transmitted; and a video data reproducing unit operable to output and reproduce each received set of sectional video data in the order of reproduction.

For this construction, a viewer can obtain a video reproduction table that specifies sets of sectional video data in a certain reproducing order which form video data that is desired by the viewer. This allows the viewer to watch the desired video data without requiring him to edit the sets of sectional video data by himself to create the desired video data.

Here, the above-described video receiving/reproducing apparatus may further include: a table request receiving unit operable to receive a request for a video reproduction table that is stored in a video file providing apparatus; and a table requesting unit operable to transmit the received request to the video file providing apparatus storing the received video reproduction table via the Internet.

For this construction, the video receiving/reproducing apparatus can reliably obtain a desired video reproduction table.

The first object can be also achieved by an Internet broadcast system including at least one video file providing apparatus and a plurality of video receiving/reproducing apparatuses which are connected to each video file providing apparatus via the Internet. The video file providing apparatus is accessed via a Web site name. The video file providing apparatus includes: a video file storing unit operable to store a video file that consecutively stores a plurality of sets of sectional video data, where each set of sectional video data is composed of frames; a table receiving unit operable to receive a request for a set of sectional video data from each video receiving/reproducing apparatus, where the request specifies the video file and a section in the specified video file which store the set of sectional video data; a reading unit operable to analyze the received request and to read the set of sectional video data from the specified section in units of frames; and a transmitting unit operable to transmit the read set of sectional video data via the Internet to the video receiving/reproducing apparatus that has made the request. The plurality of video receiving/reproducing apparatuses each include: a table storing unit operable to store a plurality of video reproduction tables which each contain reproduction information that specifies at least one set of sectional video data in an order of reproduction of each set of sectional video data; a table designation receiving unit operable to receive a designation of a video reproduction table that is stored in the table storing unit; a table reading unit operable to read the designated video reproduction table from the table storing unit; a requesting unit operable to transmit via the Internet, in accordance with reproduction information that is contained in the read video reproduction table, a request for each set of sectional video data to a video file providing apparatus storing the set of sectional video data, where the requesting unit transmits the request in an order of reproduction that is shown in the reproduction information; a video receiving unit operable to receive each set of sectional video data from a video file providing apparatus to which a request has been transmitted; and a video data reproducing unit operable to output and reproduce each received set of sectional video data in the order of reproduction.

The first object can be also achieved by an Internet broadcast system including at least one video file providing apparatus and a plurality of video receiving/reproducing apparatuses that are connected via the Internet to each video file providing apparatus. The video file providing apparatus includes a video file storing device and a table storing device that are accessed via a Web site name. The video file providing device includes: a video file storing unit operable to store a video file that consecutively stores a plurality of sets of sectional video data, where each set of sectional video data is composed of frames; a receiving unit operable to receive a video request for a set of sectional video data from each video receiving/reproducing apparatus, where the request specifies the video file and a section in the specified video file which store the set of sectional video data; a reading unit operable to analyze the received request and to read the set of sectional video data from the specified section in units of frames; and a transmitting unit operable to transmit the read set of sectional video data via the Internet to the video receiving/reproducing apparatus that has made the request. The table storing device includes: a table storing unit operable to store a plurality of video reproduction tables which each contain reproduction information specifying at least one set of sectional video data in an order of reproduction of each set of sectional video data; a table request receiving unit operable to receive a table request from each video receiving/reproducing apparatus via the Internet, where the table request specifies a video reproduction table in the table storing unit; a table reading unit operable to read the specified video reproduction table; and a table transmitting unit operable to transmit the read video reproduction table via the Internet to the video receiving/reproducing apparatus that has made the table request. The plurality of video receiving/reproducing apparatuses each include: a table request receiving unit operable to receive a first request for a video reproduction table that is stored in the table storing device; a table requesting unit operable to transmit a table request for the video reproduction table, for which the first request has been made, to the table storing device via the Internet; a table receiving unit operable to receive the video reproduction table from the table storing device via the Internet; a video requesting unit operable to transmit, in accordance with reproduction information that is contained in the received video reproduction table, a video request for each set of sectional video data to the video file storing device via the Internet in an order of reproduction that is shown in the reproduction information; a video receiving unit operable to receive each set of sectional video data from a video file providing apparatus to which a video request has been made; and a video data reproducing unit operable to output and reproduce each received set of sectional video data in the order of reproduction.

The first object can be also achieved by an Internet broadcast system including at least one video file providing apparatus and a plurality of video receiving/reproducing apparatuses that are connected via the Internet to each video file providing apparatus which is accessed via a Web site name. The video file providing apparatus includes: a mixed file storing unit operable to store at least one mixed file storing (a) a video data sequence which contains a plurality of sets of sectional video data that are arranged consecutively, and (b) a plurality of video reproduction tables that each contain reproduction information specifying at least one set of sectional video data in an order of reproduction of each set of sectional video data, where each set of sectional video data is composed of frames; a table reading unit operable to analyze a mixed file in the mixed file storing unit and to read a video reproduction table from the analyzed mixed file; a video request receiving unit operable to receive a request for a set of sectional video data from each video receiving/reproducing apparatus via the Internet, where the request specifies a mixed file, a video data sequence in the specified mixed file, and a section which is in the specified mixed file and stores the set of sectional video data; a video reading unit operable to analyze the mixed file that is specified by the received request, and to read the set of sectional video data from the specified section in units of frames; a table transmitting unit operable to transmit the read video reproduction table via the Internet; and a video transmitting unit operable to transmit the read set of sectional video data via the Internet to the video receiving/reproducing apparatus that has made the request. The plurality of video receiving/reproducing apparatuses each include: a table receiving unit operable to receive a video reproduction table from a video file providing apparatus via the Internet; a requesting unit operable to transmit, in accordance with reproduction information that is contained in the received video reproduction table, a request for each set of sectional video data to a video file providing apparatus storing the set of sectional video data via the Internet, where the requesting unit transmits the request in an order of reproduction that is shown in the reproduction information; a receiving unit operable to receive each set of sectional video data from a video file providing apparatus to which a request has been transmitted; and a video data reproducing unit operable to output and reproduce each received set of sectional video data in the order of reproduction.

For this construction, a viewer can watch desired video data, which is composed of sets of sectional video data that are arranged in a certain reproducing order, without a Web site needing to store a variety of video files that store the same combination of the sets of sectional video data in a different reproducing order.

The second object can be achieved by a video receiving/reproducing apparatus which is connected to at least one video file providing apparatus via the Internet. Each video file providing apparatus: (a) stores at least one mixed file which stores a video data sequence containing a plurality of sets of sectional video data that are arranged consecutively, and a plurality of video reproduction tables which each contain reproduction information specifying at least one set of sectional video data in an order of reproduction of each set of sectional video data; and (b) transmits a mixed file via the Internet. The video receiving/reproducing apparatus includes: a mixed file requesting unit operable to transmit a request for a mixed file to a video file providing apparatus; a mixed file receiving unit operable to receive the mixed file, for which the request has been made, from the video file providing apparatus via the Internet, where each set of sectional video data in the received mixed file is encrypted; a table generating unit operable to analyze the received mixed file, and to generate a video reproduction table, which additionally shows (a) a total reproduction fee for all sets of sectional video data that are specified in the generated video reproduction table, and (b) reproduction information which contains at least one encrypted data key that is used to decrypt each set of encrypted sectional video data in the video reproduction table; a video data reading unit operable to analyze a mixed file, which has been received by the mixed file receiving unit, and to read a set of encrypted sectional video data from the analyzed mixed file, where the read set of encrypted sectional video data correspond to an earliest order of reproduction that is shown in the reproduction information; a charging unit operable to store a decryption key for decrypting each encrypted data key, to receive the generated video reproduction table, to charge the reproduction fee, and to send the decryption key; a video data decrypting unit operable to receive the decryption key, to decrypt the encrypted data key by using the decryption key so as to generate a decrypted data key, and to decrypt the read set of encrypted sectional video data by using the decrypted data key so as to generate a set of decrypted sectional video data; and a reproducing unit operable to reproduce and output the generated set of decrypted sectional video data.

With this construction, a producer of a mixed file can reliably charge a fee for a watching of video data to a viewer who has downloaded a mixed file.

The third object can be achieved by the above-described video receiving/reproducing apparatus, wherein the generated video reproduction table additionally contains (a) an identifier that identifies a manufacturer of an authoring tool that is used to generate the received mixed file, and (b) either a share or a formula which is used to calculate the share to be distributed, out of the reproduction fee, to the identified manufacturer. The charging unit may include a share calculating unit operable to calculate the share according to the formula when the formula is contained in the video reproduction table, and to store the share with the identifier. A fee which is equal to the reproduction fee minus the share may be paid to an organization or a person, which may include a producer of the received mixed file.

For this construction, a manufacturer of an authoring tool of a mixed file can make a profit in accordance with use of the mixed file, in addition to a profit that is derived from selling the authoring tool. At the same time, the manufacture can pay a reproduction fee minus the calculated share to a producer or a retail dealer of a mixed file.

The third object can be also achieved by the above-described video receiving/reproducing apparatus, wherein the generated video reproduction table additionally contains (a) an identifier that identifies a manufacturer of an authoring tool that is used to generate the received mixed file, and (b) a percentage of a share to be distributed, out of the reproduction fee, to the identified manufacturer. The charging unit may include a share calculating unit operable to multiply the reproduction fee by the percentage so as to calculate the share, and to store the calculated share with the identifier, wherein a fee which is equal to the reproduction fee minus the share is paid to a producer of the received mixed file.

For this construction, a manufacturer of an authoring tool of a mixed file can make a profit in accordance with use of the mixed file, in addition to a profit that is derived from selling the authoring tool.

The first object can be also achieved by a computer-readable recording medium storing (a) a program to have a computer perform operations of a video receiving/reproducing apparatus, and (b) a plurality of video reproduction tables which each contain reproduction information that specifies at least one set of sectional video data in an order of reproduction of each set of sectional video data. The computer is connected via the Internet to at least one video file providing apparatus. Each video file providing apparatus is accessed via a Web site name, stores a video file consecutively storing a plurality of sets of sectional video data, reads a set of sectional video data that has been requested, and transmits the read set of sectional video data via the Internet. The operations include: a table designation receiving step for receiving a designation of a video reproduction table from among the plurality of video reproduction tables; a table reading step for reading the designated video reproduction table; a requesting step for transmitting via the Internet, in accordance with reproduction information that is contained in the read video reproduction table, a request for each set of sectional video data to a video file providing apparatus storing the set of sectional video data, where the requesting step transmits the request in an order of reproduction that is shown in the reproduction information; a receiving step for receiving each set of sectional video data from a video file providing apparatus to which a request has been transmitted; and a video data reproducing step for outputting and reproducing each received set of sectional video data in the order of reproduction.

When this recording medium is applied to a computer, the computer can function as a video receiving/reproducing apparatus which outputs and reproduces the same combination of sets of sectional video data in a variety of reproducing orders.

BRIEF DESCRIPTION OF THE DRAWINGS

These and the other objects, advantages and features of the present invention will become more apparent from the following detailed description when taken in conjunction with the accompanying drawings which illustrate specific embodiments of the present invention.

In the drawings:

FIG. 3 shows an example of a video reproduction table that is stored in a table storing unit of the first embodiment;

FIG. 7 shows an example of a video reproduction table that is stored in a table storing unit of the second embodiment;

FIG. 15 shows an example of a mixed file that is stored in a mixed file storing unit of the fifth embodiment;

FIG. 16 shows an example of a video reproduction table that is generated by a mixed file analyzing unit of the fifth embodiment;

FIG. 21 shows an example of a video reproduction table that is stored in a mixed file of the sixth embodiment.

DETAILED DESCRIPTION OF THE INVENTION

The following describes an Internet broadcast system of the present invention with reference to several embodiments accompanied by drawings.

First Embodiment

Figure 1:
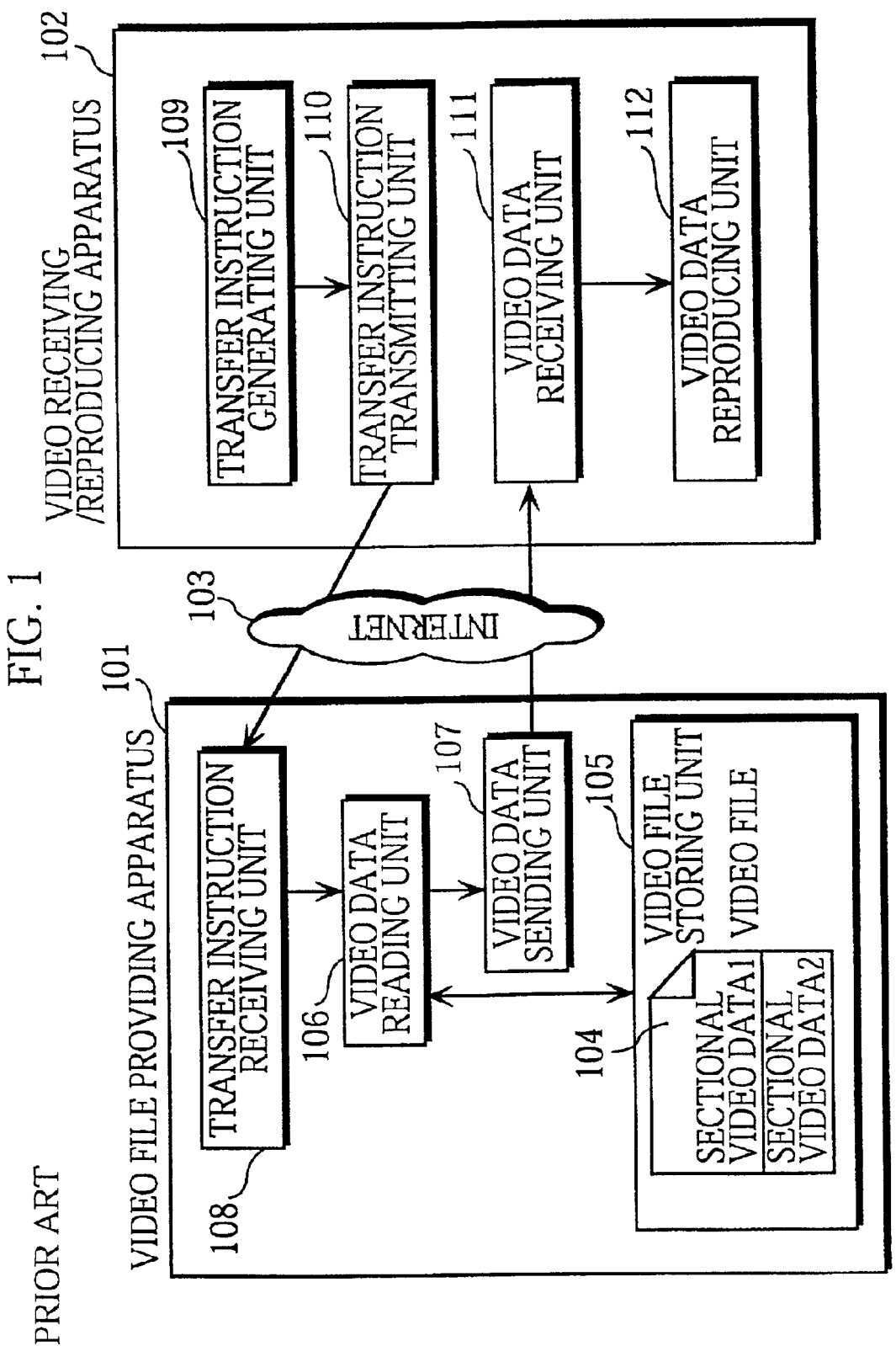
FIG. 1 shows a construction of a conventional Internet broadcast system.
Figure 2:
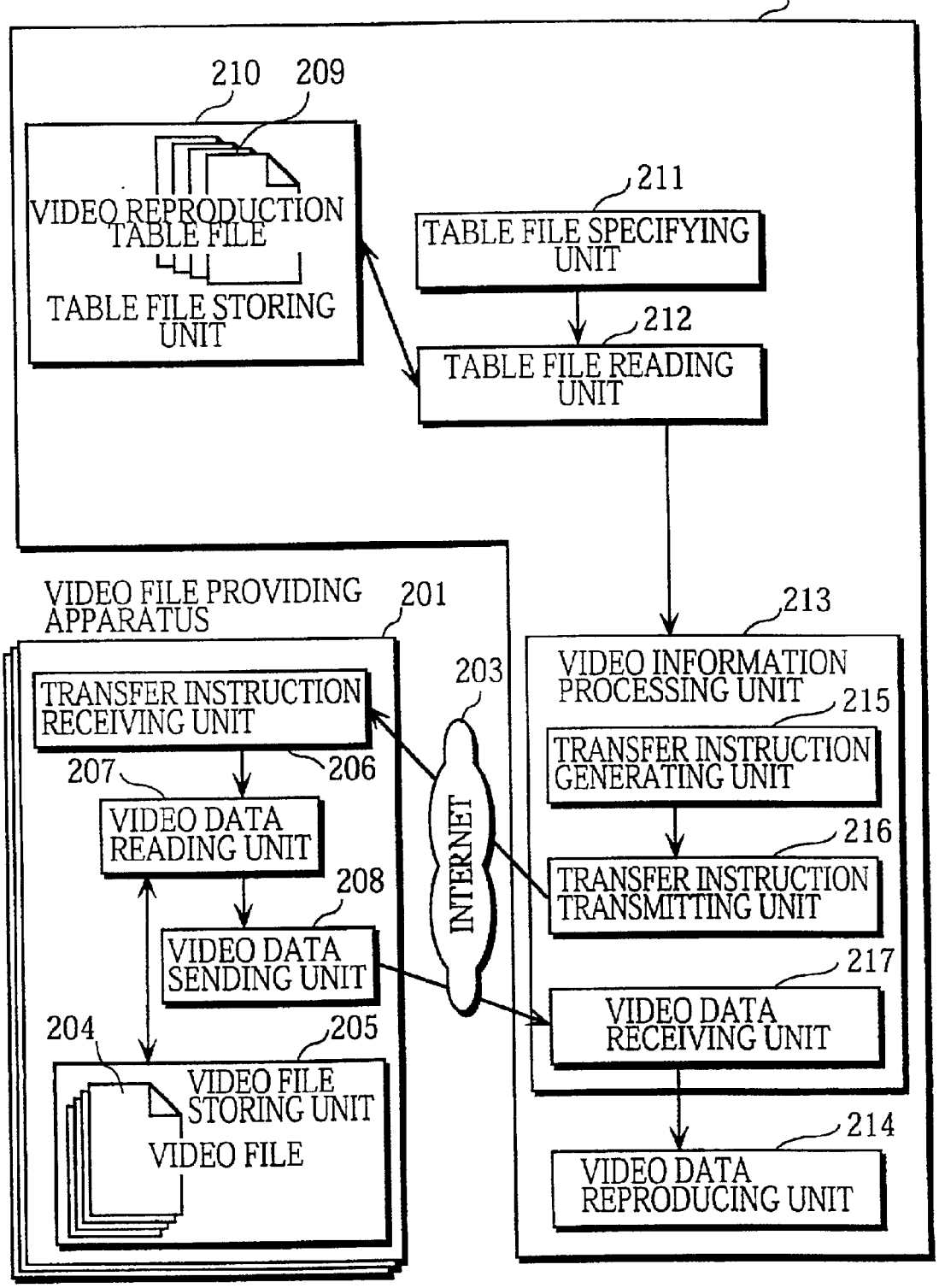
FIG. 2 shows a construction of an Internet broadcast system according to the first embodiment of the present invention.

FIG. 2 shows a construction of an Internet broadcast system according to the first embodiment of the present invention. The Internet broadcast system comprises one or more video file providing apparatuses 201 and a plurality of video receiving/reproducing apparatuses 202, each of which is connected to the one or more video file providing apparatuses 201 via the Internet 203.

The video file providing apparatus 201 is identified by a Web site name that is shown as a URL (uniform resource location) or the like. The video file providing apparatus 201 includes the following elements: a video file storing unit 205 that stores a plurality of video files 204; a transfer instruction receiving unit 206 that receives, from one of the video receiving/reproducing apparatuses 202, a transfer instruction to have video data transferred; a video data reading unit 207 that reads specified video data which is stored in a video file in accordance with the received transfer instruction; and a video data transmitting (sending) unit 208 that transmits the read video data via the Internet 203 to the video receiving/reproducing unit 202.

The plurality of video files 204 each consecutively include a plurality of sets of sectional video data. Each set of sectional video data is read from these video files 204 in units of frames.

The video file storing unit 205 stores and manages the plurality of video files 204 in units of video frames.

The transfer instruction receiving unit 206 receives a transfer instruction from the video receiving/reproducing apparatus 202 via the Internet 203, and sends the received transfer instruction to the video data reading unit 207.

This transfer instruction contains the following: an IP (Internet protocol) address that specifies the video receiving/reproducing apparatus 202 which sent the transfer instruction; a video file name of a video file storing sectional video data; a number (hereafter called a "read-start frame number") which is assigned to a frame from which a read should be started in the above-described video file; and a number of reading frames that should be read as the sectional video data.

In accordance with the transfer instruction that is sent from the transfer instruction receiving unit 206, the video data reading unit 207 reads the sectional video data from the video file with the video file name that is contained in the transfer instruction. This read starts from a frame with the read-start frame number, and is performed by the number of reading frames that are shown in the transfer instruction. The video data reading unit 207 then sends the read sectional video data together with the IP address that is contained in the instruction to the video data transmitting unit 208.

The video data transmitting unit 208 then transmits the sectional video data via the Internet 203 to the video receiving/reproducing apparatus 202 which is specified by the IP address and which sent the transfer instruction.

The video receiving/reproducing apparatuses 202 each include the following elements: a table file storing unit 210 that stores a plurality of table files 209; a table file specifying unit 211; a table file reading unit 212; a video information processing unit 213; and a video data reproducing unit 214. The video information processing unit 213 includes a transfer instruction generating unit 215, a transfer instruction transmitting unit 216, and a video data receiving unit 217.

FIG. 3 shows an example of a video reproduction table 301 that is stored in a table file 209. The video reproduction table 301 contains a table file name 302 which specifies this table file, and two sets of reproduction information which are written in two rows for two sets of sectional video data to be reproduced in a reproducing order 303.

Each set of reproduction information contains the following items: a site name 304; a video file name 305; a read-start frame number 306; and a number of reading frames 307.

The site name 304 shows a site name specifying the video file providing apparatus 201 that stores a video file containing a set of sectional video data.

The video file name 305 shows a name of this video file storing the set of sectional video data.

The read-start frame number 306 and the number of reading frames 307 specify locations from which the set of sectional video data should be read. This is to say, when a 110 frame number of the first frame in the video file is "0", the set of sectional video data starts with a video frame to which the read-start frame number 306 is assigned, and is composed of consecutive frames whose total number is specified by the number of reading frames 307.

Note that the above-described locations for the set of sectional video data may be specified by a reproduction start time and a reproduction duration that are represented in the so-called time code, which is usually used to represent a reproduction time of video data.

The reproduction table 301 shows that the two sets of sectional video data are reproduced as video data corresponding to the table file name 302 of "close-up view of XXXX". The two sets of sectional video are as follows: sectional video data, which is contained in the "video file 5", that starts with a frame to which a read-start frame number of "1800" is assigned, and is composed of "300" frames; and sectional video data, which is contained in the "video file 6", that starts with a frame to which a read-start frame number of "600" is assigned, and is composed of "900" frames.

The table file specifying unit 211 has a display unit (not shown in FIG. 2) for displaying a menu containing table file names for different video reproduction tables, and the table file specifying unit 211 receives a user operation that designates a desired table file name. It is of course alternatively possible to distribute printed materials containing table file names of these video reproduction tables to each user in advance and to have the user designate, for instance, a number which is assigned to a desired table file name.

The table file specifying unit 211 then notifies the table file reading unit 212 of the designated table file name.

The table file reading unit 212 then reads a video reproduction table having the designated table file name from the table file storing unit 210, and sends the read video reproduction table to the transfer instruction generating unit 215 in the video information processing unit 213.

In accordance with the sent video reproduction table, the transfer instruction generating unit 215 generates a transfer instruction containing an IP address of the video receiving/reproducing apparatus 202. The transfer instruction generating unit 215 first generates a transfer instruction to transfer sectional video data that is associated with the earliest reproducing order which is shown in the sent video reproduction table, and then generates a transfer instruction for sectional video data corresponding to a later reproducing order. Each transfer instruction is directed to a site name of a video file providing apparatus 201 storing a video file having a video file name in the sent video reproduction table, and specifies sectional video data by the video file name, a read-start frame number, and a number of reading frames. The transfer instruction generating unit 215 then sends the transfer instruction to the transfer instruction transmitting unit 216.

The transfer instruction transmitting unit 216 transmits the transfer instruction to the site name 304 of one of the video file providing apparatuses 201 via the Internet 203.

The video data receiving unit 217 receives sectional video data from the video file providing apparatus 201 which is specified by the site name to which the transfer instruction is directed, and sends the received sectional video data to the video data reproducing unit 214.

The video data reproducing unit 214 then reproduces and outputs the sent sectional video data.

For instance, when the "video file 5" in FIG. 3 with a reproducing order "1" stores sectional video data for a distant view of a landscape and the "video file 6" with a reproducing order "2" stores sectional video data for part of the landscape in a close-up view, the video data reproducing unit 214 reproduces and outputs video images that change from the distant view to the close-up view in accordance with the video reproduction table 301.

On the other hand, if a viewer wishes to watch the above-described landscape images that change from the close-up view to the distant view, the viewer selects a table file name that specifies a table file storing a reproducing order which is opposite to the reproducing order 303 shown in the video reproduction table 301 in FIG. 3. With this method, it becomes unnecessary in a Web site of a video file providing apparatus 201 to use different video file names to specify the same set of sectional video data that is contained in the above-described two different types of landscape images which the viewer wishes to watch.

The processing of the Internet broadcast system of the first embodiment will now be described with reference to the flowcharts of FIGS. 4 and 5.

Figure 4:
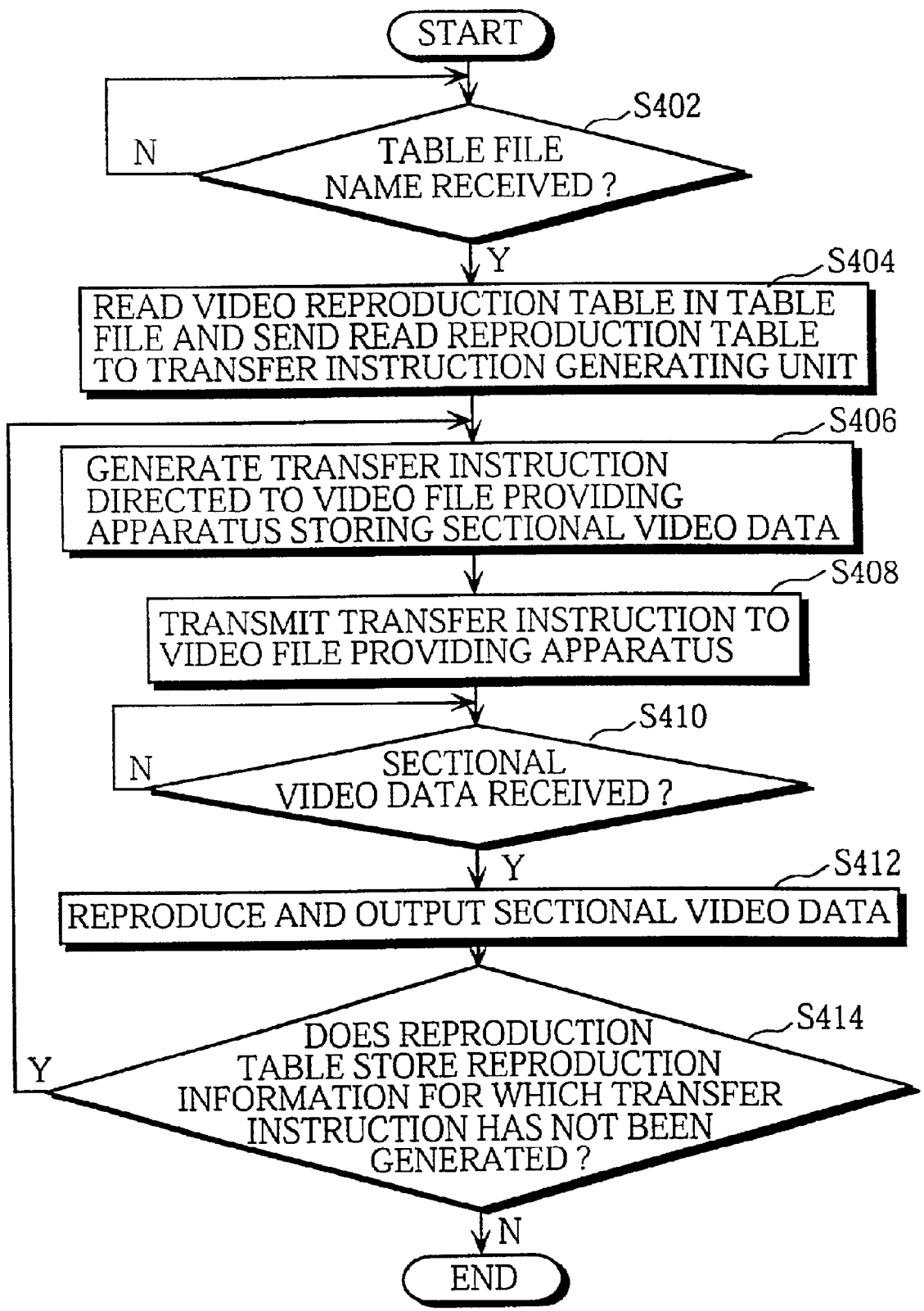
FIG. 4 is a flowchart showing the processing of a video receiving/reproducing apparatus of the first embodiment.

FIG. 4 is a flowchart showing the processing of the video receiving/reproducing apparatus 202.

The table file specifying unit 211 waits until it receives a user operation designating a table file name, and notifies the table file reading unit 212 of the designated table file name (step S402).

The table file reading unit 212 then reads a video reproduction table in the table file, and sends the read video reproduction table to the transfer instruction generating unit 215 (step S404).

The transfer instruction generating unit 215 generates a transfer instruction, which is directed to a video file providing apparatus 201 that is specified by a site name which is associated with the earliest reproducing order shown in the sent video reproduction table (step S406).

The transfer instruction transmitting unit 216 transmits the generated transfer instruction to the video file providing apparatus 201 that is specified by the above-described site name (step S408).

The video data receiving unit 217 waits until it receives sectional video data from the video file providing apparatus 201, and sends the received sectional video data to the video data reproducing unit 214 (step S410).

The video data reproducing unit 214 reproduces and outputs the sent sectional video data (step S412).

The transfer instruction generating unit 215 then judges whether the above-described video reproduction table stores a set of reproduction information for which a transfer instruction has not been generated yet (step S414). If so, the processing returns to step S408. If not, the processing is terminated.

Figure 5:
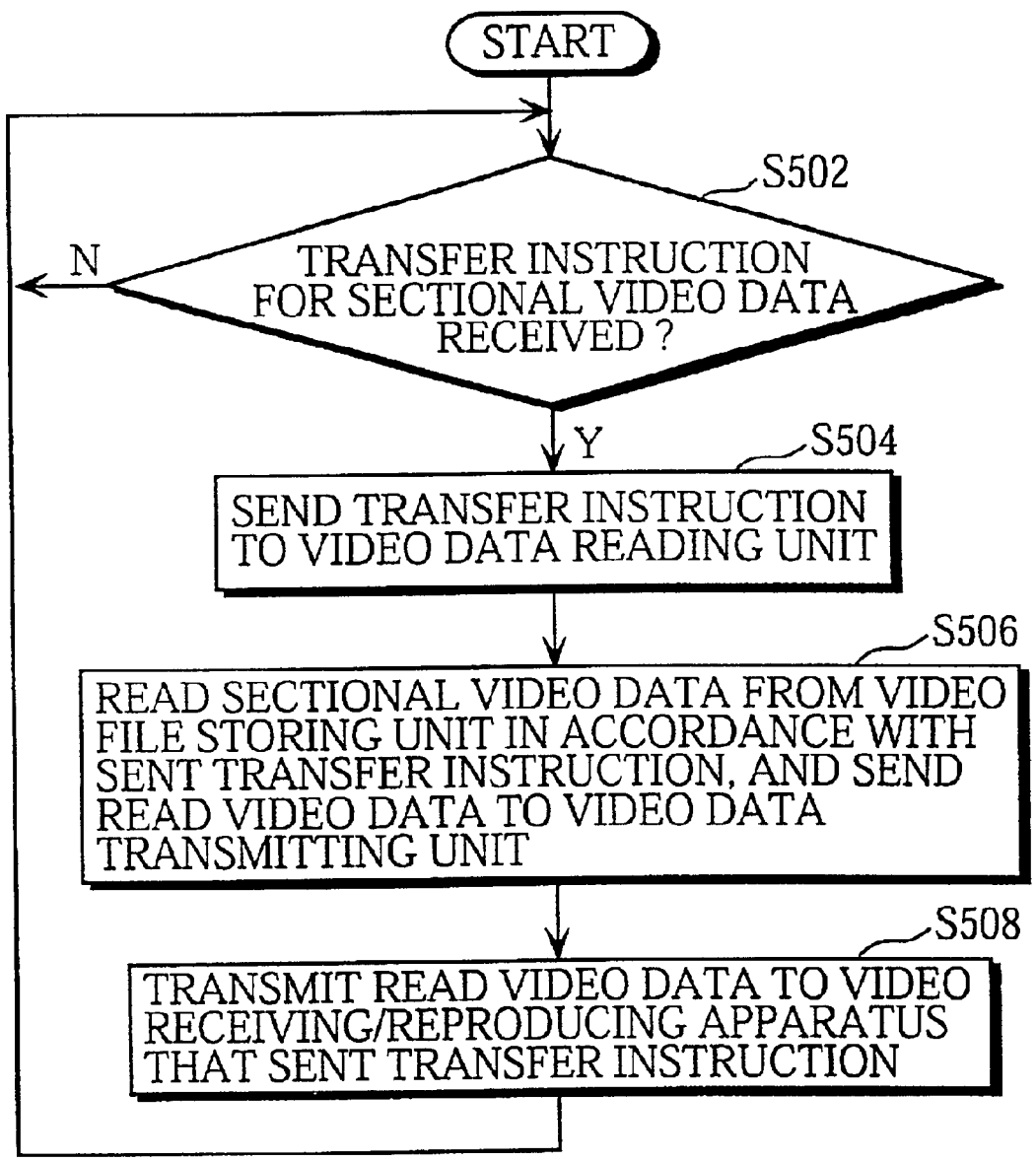
FIG. 5 is a flowchart showing the processing of a video file providing apparatus of the first embodiment.

FIG. 5 is a flowchart showing the processing of the video file providing apparatus 201.

The transfer instruction receiving unit 206 waits until it receives a transfer instruction from a video receiving/reproducing apparatus 202 (step S502), and sends the received transfer instruction to the video data reading unit 207 (step S504).

In accordance with the sent transfer instruction, the video data reading unit 207 reads sectional video data from the video file storing unit 205, and sends the read sectional video data to the video data transmitting unit 208 (step S506).

The video data transmitting unit 208 transmits the read sectional video data via the Internet 203 to the video receiving/reproducing apparatus 202 which sent the above-described transfer instruction (step S508), and the processing returns to step S502.

Second Embodiment

Figure 6:
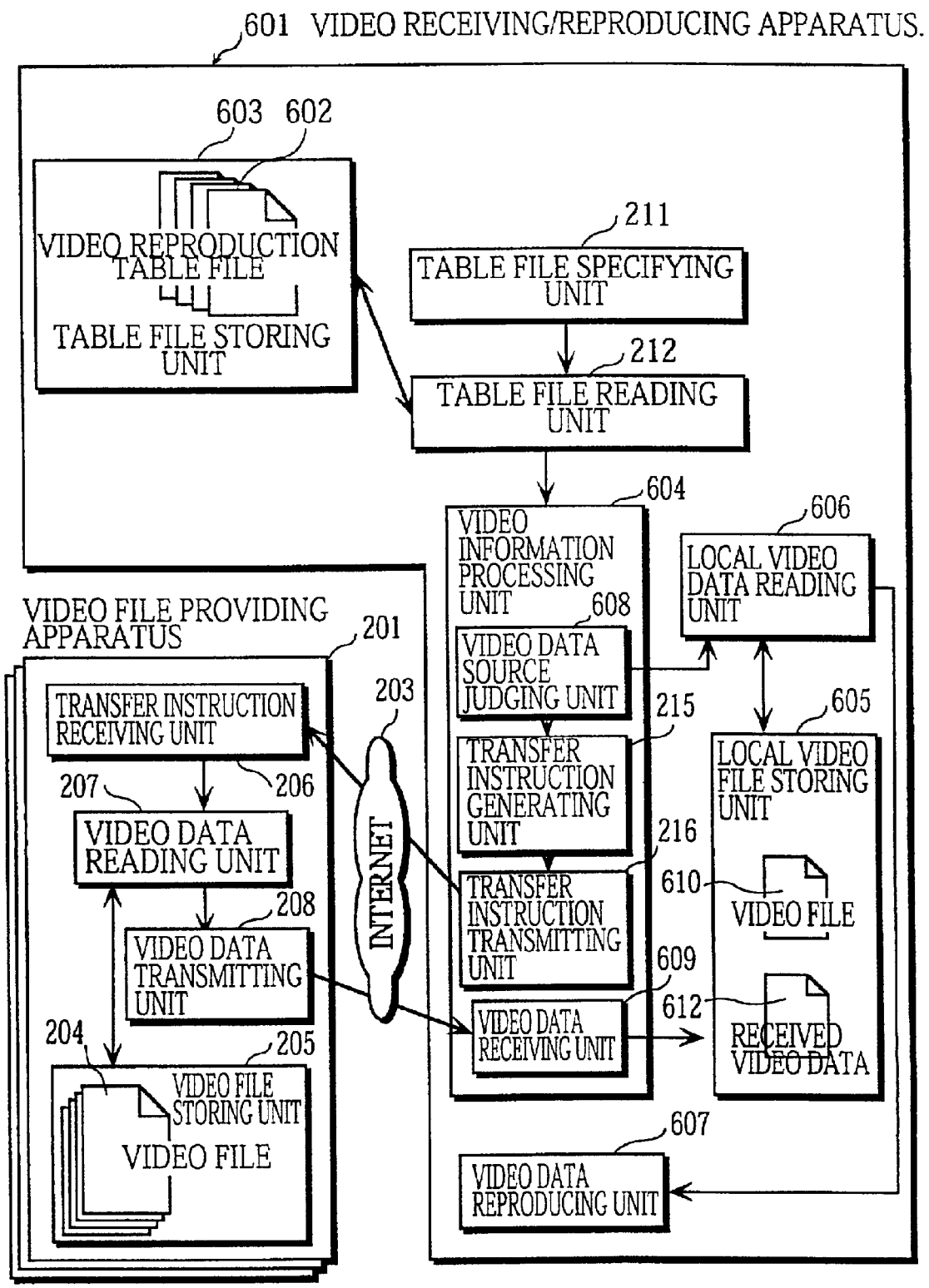
FIG. 6 shows a construction of an Internet broadcast system according to the second embodiment of the present invention.

FIG. 6 shows a construction of an Internet broadcast system according to the second embodiment of the present invention. In FIG. 6, elements that are basically the same as in the first embodiment are given the same reference number as used in the first embodiment. The following only describes elements which are unique to the second embodiment.

The Internet broadcast system of the second embodiment comprises one or more video file providing apparatuses 201 and a plurality of video receiving/reproducing apparatuses 601, each of which is connected to the one or more video file providing apparatuses 201 via the Internet 203.

The video receiving/reproducing apparatuses 601 each include the following elements: a table file storing unit 603 that stores a plurality of table files 602; a table file specifying unit 211; a table file reading unit 212; a video information processing unit 604; a local video file storing unit 605; a local video data reading unit 606; and a video data reproducing unit 607. The video information processing unit 604 includes a video data source judging unit 608, a transfer instruction generating unit 215, a transfer instruction transmitting unit 216, and a video data receiving unit 609. The local video file storing unit 605 contains a video file 610 and received video data 612.

FIG. 7 shows an example of a video reproduction table that is stored in the table file storing unit 603. This video reproduction table 701 contains a table file name 702, and two sets of reproduction information which are written in two rows for two sets of sectional video data to be reproduced in a reproducing order 703.

Each set of reproduction information contains the following items: a site name 704; a video file name 705; a read-start frame number 706; and a number of reading frames 707.

Unlike the video reproduction table 301 that is shown in the first embodiment, this video reproduction table 701 contains "local" as a site name 704. This expresses that a "video file 6" which stores associated sectional video data exists not in any of the video file providing apparatuses 201 but in the local video file storing unit 605 in the video receiving/reproducing apparatus 601 which stores this video reproduction table 701.

When video data that is specified by the table file name 702 of "0000" is reproduced, the following frames are reproduced in order: 300 frames that start with a frame with a read-start frame number "1800" in a "VIDEO FILE 5" in a "SITE 1" of a video file providing apparatus 201; and 900 frames that start with a frame with a read-start frame number "600" in a "VIDEO FILE 6" in the local video file storing unit 605.

The table file reading unit 212 reads a video reproduction table like the above-described video reproduction table 701, and sends the read video reproduction table to the video data source judging unit 608 in the video information processing unit 604.

The video data source judging unit 608 judges whether the sent video reproduction table contains "local" as the site name 704. If the video data source judging unit judges that the sent video reproduction table does not contain "local" as the site name 704, the video data source judging unit 608 sends reproduction information in the video reproduction table to the transfer instruction generating unit 215 as in the first embodiment and to the local video data reading unit 606. On the other hand, when the video data source judging unit 608 judges that the sent video reproduction table contains "local" as the site name 704, the video data source judging unit 608 sends the reproduction information that is associated with the site name "local" to the local video data reading unit 606.

The video data receiving unit 609 receives sectional video data from the video data transmitting unit 208 in one of the video file providing apparatuses 201, and writes the received sectional video data as received video data 612 into the local video file storing unit 605.

The local video file storing unit 605 is achieved by a DVD (digital versatile disc), a DVD-RAM, and the like. The local video file storing unit 605 stores the video file 610 into the DVD or the like, and the received video data 612, which has been received by the video data receiving unit 609, into the DVD-RAM or the like.

In accordance with the reproduction information that is sent from the video data source judging unit 608, the local video data reading unit 606 reads, from the local video file storing unit 605, either specified sectional video data in the video file 610 or the received video data 612, and sends the read sectional video data to the video data reproducing unit 607.

The video data reproducing unit 607 reproduces and outputs the video data which is sent by the local video data reading unit 606.

The video data reproducing unit 607 of the second embodiment can reproduce and output video data which is composed of, for instance, the following: video data stored in a video file of commercial DVD software; and a part of the video data that is stored in the video file providing apparatus 201. This increases the variety of video images which are available to the user.

In the second embodiment, video data that is received by the video data receiving unit 609 is first placed into the local video file storing unit 605 as the received video data 612. However, it is alternatively possible to have the video data receiving unit 609 send the received video data directly to the video data reproducing unit 607.

Figure 8:
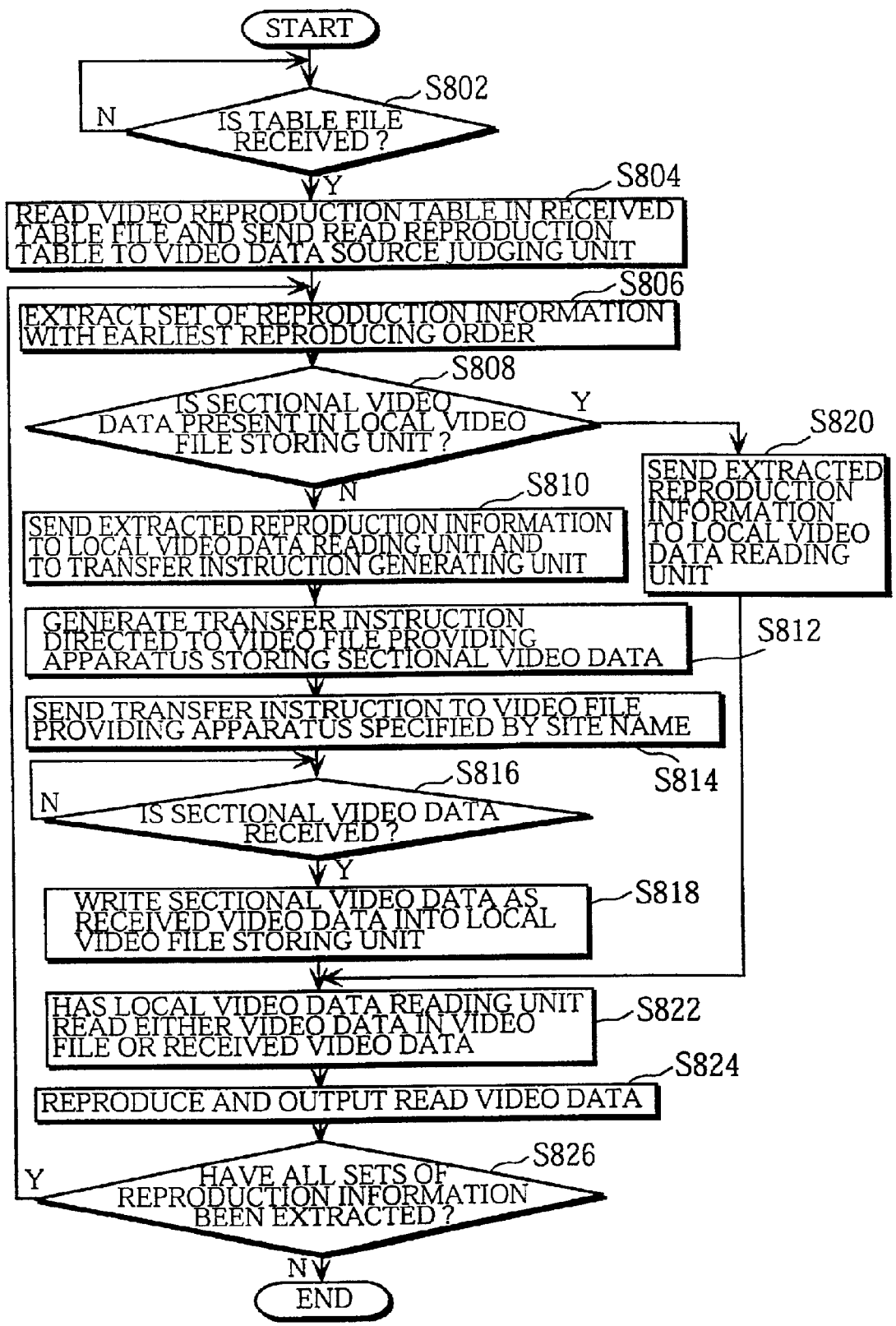
FIG. 8 is a flowchart showing the processing of a video receiving/reproducing apparatus of the second embodiment.

The processing of each video receiving/reproducing apparatus 601 of the second embodiment will now be described with reference to the flowchart of FIG. 8.

The table file specifying unit 211 waits until it receives a user designation of a table file name of one of the table files 602 that are stored in the table file storing unit 603, and sends the designated table file name to the table file reading unit 212 (step S802).

The table file reading unit 212 then reads a video reproduction table having the designated table file name, and sends the read video reproduction table to the video data source judging unit 608 in the video information processing unit 604 (step S804).

The video data source judging unit 608 extracts one set of reproduction information that is associated with the earliest reproducing order from the sent video reproduction table (step S806).

The video data source judging unit 608 then judges if the site name 704 in the extracted reproduction information is shown as "local" so as to judge whether sectional video data corresponding to the extracted reproduction information is stored in the local video file storing unit 605 (step S808). If such corresponding sectional video data is not stored in the local video file storing unit 605, the video data source judging unit 608 sends the extracted reproduction information to the transfer instruction generating unit 215 and the local video data reading unit 606 (step S810).

The transfer instruction generating unit 215 then generates, for the corresponding sectional video data, a transfer instruction which is directed to one of the video file providing apparatuses 201 that is specified by the site name which is shown in the sent reproduction information (step S812).

The transfer instruction transmitting unit 216 then transmits the generated transfer instruction to the video file providing apparatus 201 via the Internet 203 (step S814).

The video data receiving unit 609 waits until it receives the sectional video data from the video data transmitting unit 208 of the video file providing apparatus 201 via the Internet 203 (step S816), and writes the received sectional video data into the local video file storing unit 605 as received video data 612 (step S818).

On the other hand, when the video data source judging unit 608 judges in step S808 that corresponding sectional video data is stored in the local video file storing unit 605, the video data source judging unit 608 sends the extracted reproduction information to the local video data reading unit 606 (step S820).

In accordance with the extracted reproduction information that is sent from the video data source judging unit 608, the local video data reading unit 606 reads either the received video data 612 that has been written in step S818 or sectional video data corresponding to frames which start with a frame with a read-start frame number and whose total number is equal to a number of reading frames (step S822). The local video data reading unit 606 then sends the read video data to the video data reproducing unit 607 (step S822).

The video data reproducing unit 607 then reproduces and outputs the video data that is sent by the local video data reading unit 606 (step S824).

The video data source judging unit 608 then judges if it has extracted all of the sets of reproduction information from the sent video reproduction table (step S826). If so, the processing is terminated. On the other hand, if the video data source judging unit 608 judges that all of the sets of reproduction information have not been extracted from the sent video reproduction table, the processing returns to step S806.

Third Embodiment

Figure 9:
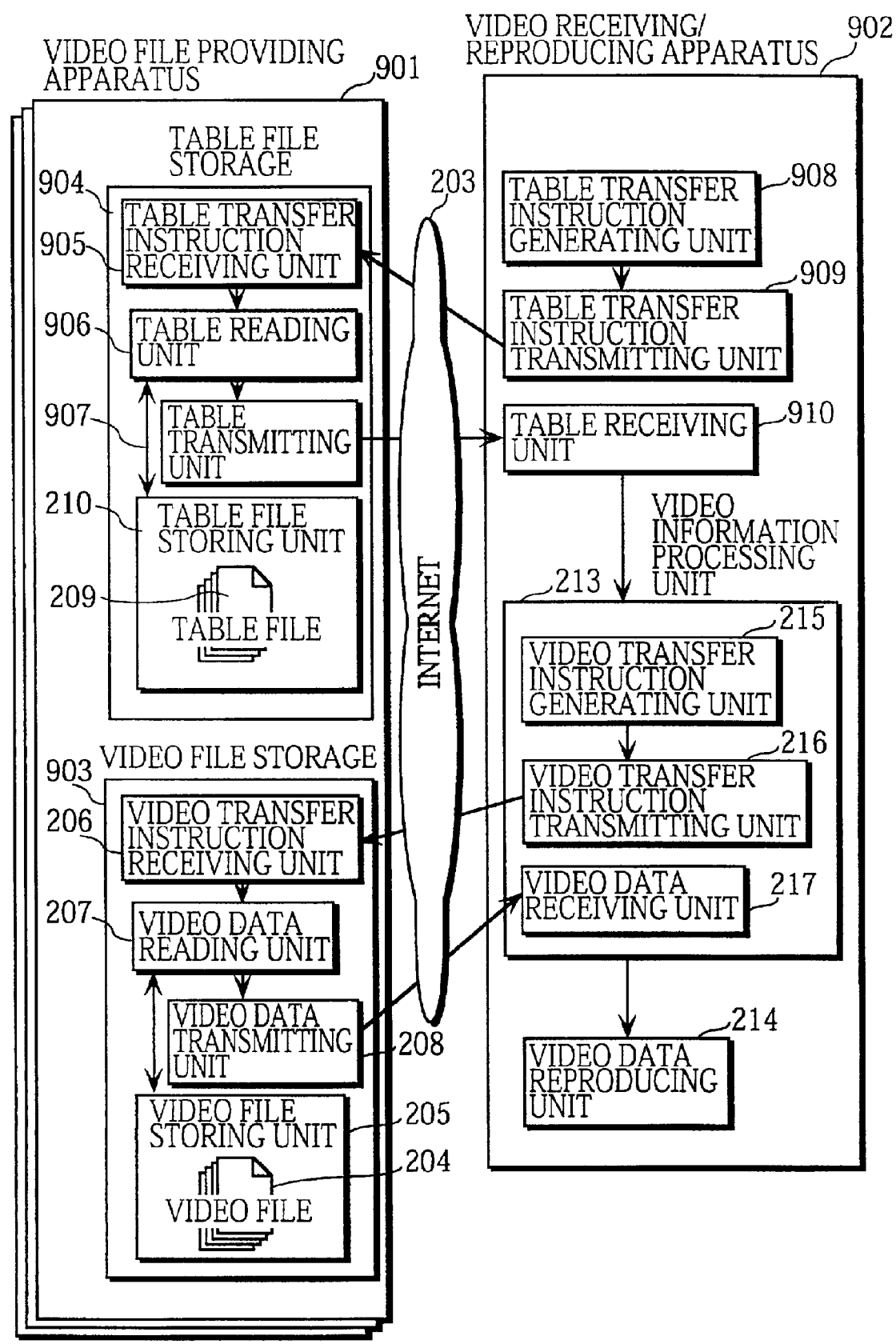
FIG. 9 shows a construction of an Internet broadcast system according to the third embodiment of the present invention.

FIG. 9 shows a construction of an Internet broadcast system according to the third embodiment of the present invention. The Internet broadcast system of the third embodiment comprises one or more video file providing apparatuses 901 and a plurality of video receiving/reproducing apparatuses 902, each of which is connected to the one or more video file providing apparatuses 901 via the Internet 203.

The video file providing apparatuses 901 each include a video file storage 903 and a table file storage 904.

The video file storage 903 is achieved by a Web site and is specified by a Web site name which is shown as an URL. The video file storage 903 has basically the same construction as the video file providing apparatus 201 of the second embodiment, and includes a video file storing unit 205 for storing a plurality of video files 204, a video transfer instruction receiving unit 206, a video data reading unit 207, and a video data transmitting unit 208.

The table file storage 904 is achieved by the same Web site as the video file storage 903, and is specified by the above-described Web site name which is shown as the URL. The table file storage 904 includes the following elements: a table file storing unit 210 for storing a plurality of table files 209; a table transfer instruction receiving unit 905; a table reading unit 906; and a table transmitting unit 907. In this way, the video file providing apparatus 901 of the third embodiment contains storage corresponding to a table file storing unit 210 of the first embodiment which is contained, in the first embodiment, in a video receiving/reproducing apparatus 202.

The video receiving/reproducing apparatuses 902 each include a table transfer instruction generating unit 908; a table transfer instruction transmitting unit 909; a table receiving unit 910; a reproduction (video) information processing unit 213; and a video data reproducing unit 214. The video information processing unit 213 contains a video transfer instruction generating unit 215, a video transfer instruction transmitting unit 216, and a video data receiving unit 217.

In FIG. 9, elements that are basically the same as in the first embodiment are given the same reference number as used in the first embodiment, and will not be described. The following only describes elements which are unique to the third embodiment.

The table transfer instruction receiving unit 905 receives a table transfer instruction from one of the video receiving/reproducing apparatuses 902 via the Internet 203, and sends the received table transfer instruction to the table reading unit 906.

This table transfer instruction contains an IP address specifying the video receiving/reproducing apparatus 902 and a table file name specifying a video reproduction table.

The table reading unit 906 reads the video reproduction table that is specified by the table file name contained in the table transfer instruction from the table storing unit 210, and sends the read video reproduction table and the IP address of the video receiving/reproducing apparatus 902 to the table transmitting unit 907.

The table transmitting unit 907 then transmits the sent video reproduction table to the IP address of the video receiving/reproducing apparatus 902 via the Internet 203.

The table transfer instruction generating unit 908 in the video receiving/reproducing apparatus 902 has a display unit (not shown in FIG. 9) for displaying a menu containing table file names specifying video reproduction tables so as to receive a user designation of a desired table file name. The table transfer instruction generating unit 908 then generates a table transfer instruction containing the designated table file name and an IP address of the video receiving/reproducing apparatus 902, and sends the generated table transfer instruction to the table transfer instruction transmitting 110 unit 909.

The table transfer instruction transmitting unit 909 stores, in advance, a URL that is a site name of the table file storage 904 which stores the video reproduction table that is specified by the designated table file name. The table transfer instruction transmitting unit 909 transmits the table transfer instruction that is received from the table transfer instruction generating unit via the Internet 203 to this URL specifying the table file storage 904.

The table receiving unit 910 in the video receiving/reproduction apparatus 902 receives the video reproduction table from the table file storage 904 via the Internet 203, and sends the received video reproduction table to the video transfer instruction generating unit 215 in the video information processing unit 213.

The processing of the Internet broadcast system of the third embodiment will now be described with reference to FIGS. 10 and 11.

Figure 10:
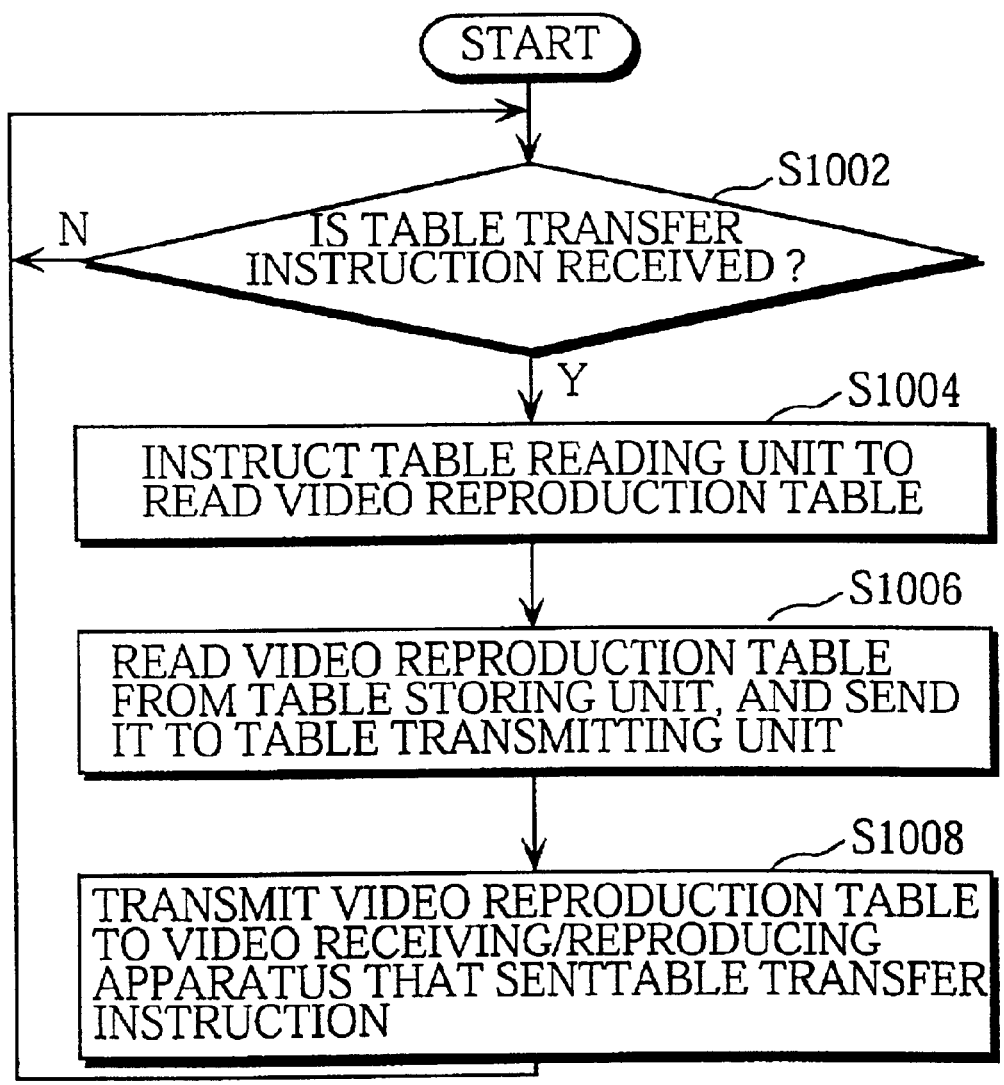
FIG. 10 is a flowchart showing the processing of a table file storage of a video file providing apparatus of the third embodiment.

FIG. 10 is a flowchart showing the processing of the table file storage 964 in the video file providing apparatus 901.

The table transfer instruction receiving unit 905 waits until it receives a table transfer instruction from one of the video receiving/reproducing apparatus 902 via the Internet 203 (step S1002), sends the received table transfer instruction to the table reading unit 906, and instructs the table reading unit 906 to read a video reproduction table (step S1004).

The table reading unit 906 reads, from the table file storing unit 210, a video reproduction table which is specified by a table file name that is shown in the table 110 transfer instruction, and sends the read video reproduction table to the table transmitting unit 907 (step S1006).

The table transmitting unit 907 transmits the sent video reproduction table via the Internet 203 to the video receiving/reproducing apparatus 902 which sent the above-described table transfer instruction (step S1008), and the processing returns to step S1002.

The processing by the video file storage 903 to send sectional video data to the video receiving/reproducing apparatus 902 is the same as the processing by the video file providing apparatus 201 according to the first embodiment.

Figure 11:
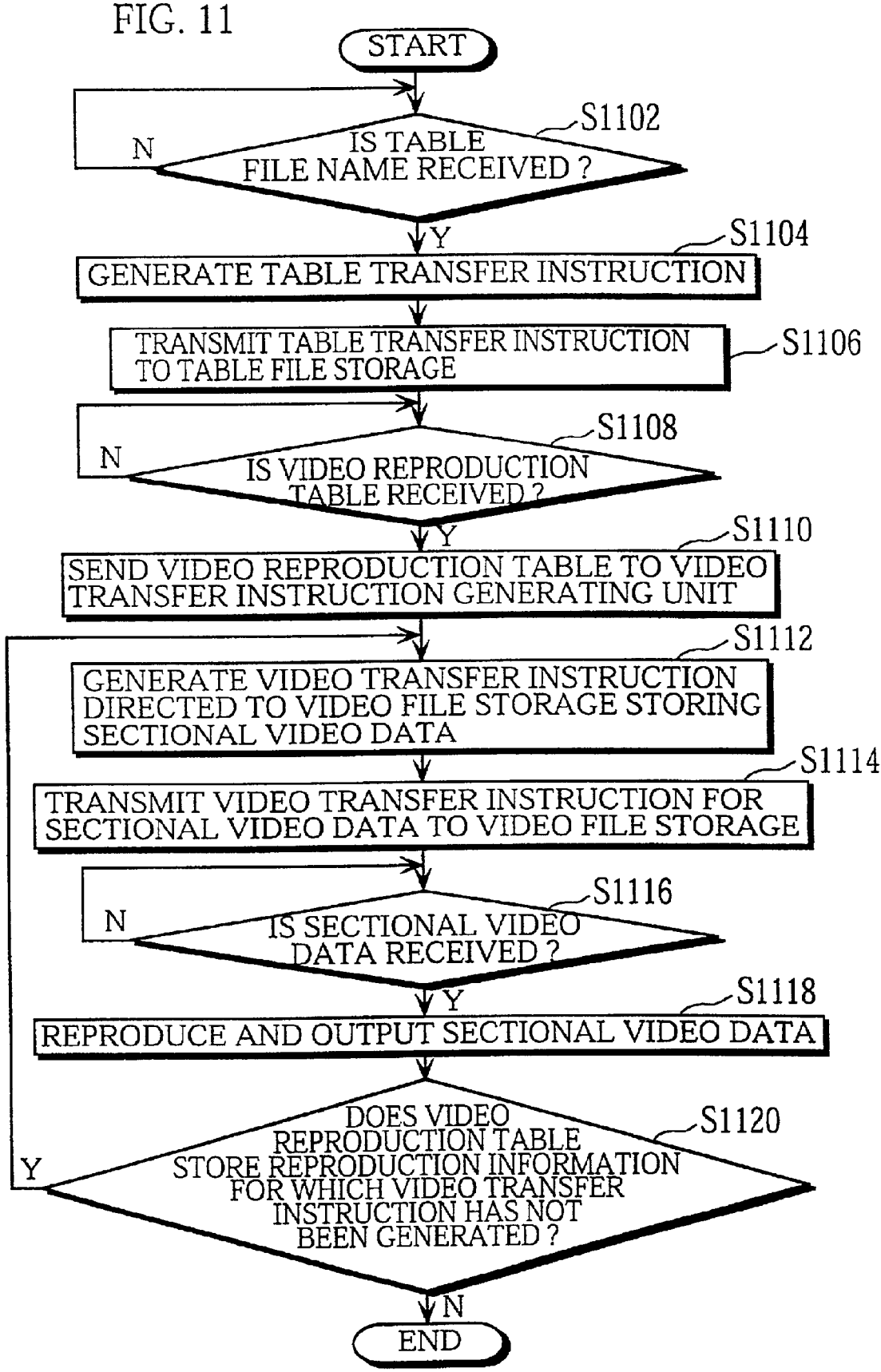
FIG. 11 is a flowchart showing the processing of a video receiving/reproducing apparatus of the third embodiment.

FIG. 11 is a flowchart showing the processing of the video receiving/reproducing apparatus 902.

The table transfer instruction generating unit 908 waits until it receives a user designation of a table file name specifying a desired video reproduction table (step S1102), generates a table transfer instruction for the desired video reproduction table (step S1104), and sends the generated table transfer instruction to the table transfer instruction transmitting unit 909.

The table transfer instruction transmitting unit 909 transmits the generated table transfer instruction via the Internet 203 to the table file storage 904 in the video file providing apparatus 901 (step s1106).

The table receiving unit 910 in the video receiving/reproducing apparatus 902 which sent the generated table transfer instruction waits until it receives the video reproduction table from the table file storage 904 via the Internet 203 (step S1108), and sends the received video reproduction table to the video transfer instruction generating unit 215 (step S1110).

The video transfer instruction generating unit 215 extracts a set of reproduction information which are associated with the earliest reproducing order from the sent video reproduction table, and generates a video transfer instruction, which is directed to the video file storage 903 in the video file providing apparatus 901 storing the sectional video data that is shown in the extracted reproduction information (step S11112) to instruct this video file storage 903 to send such sectional video data.

The video transfer instruction transmitting unit 216 transmits the generated video transfer instruction to the video file storage 903 which is specified by a site name that is shown in the reproduction information (step S1114).

The video data receiving unit 217 waits until it receives the requested sectional video data from the video file storage 903, and sends this sectional video data to the video data reproducing unit 214 (step S1116).

The video data reproducing unit 214 then reproduces and outputs the sectional video data (step S1118).

The video transfer instruction generating unit 215 judges if the above-described video reproduction table stores reproduction information for sectional video data for which a video transfer instruction has not been generated (step S1120). If the video transfer instruction generating unit 215 judges that the video reproduction table is not storing reproduction information for sectional video data for which a video transfer instruction has not been generated, the processing is terminated. On the other hand, if the video transfer instruction generating unit 215 judges that the video reproduction table stores reproduction information for such sectional video data, the processing returns to step S1112.

Fourth Embodiment

Figure 12:
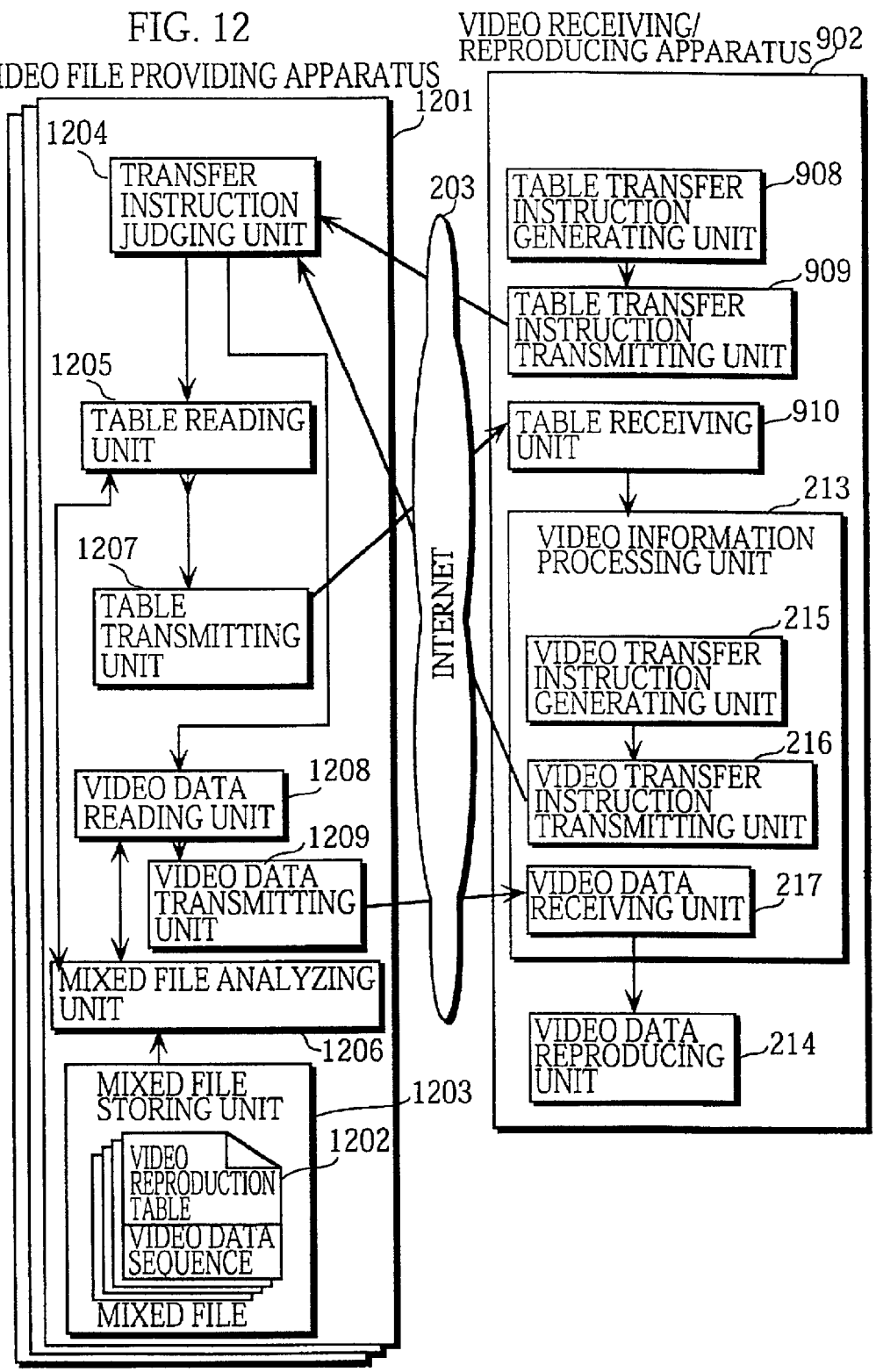
FIG. 12 shows a construction of an Internet broadcast system according to the fourth embodiment of the present invention.

FIG. 12 shows a construction of an Internet broadcast system according to the fourth embodiment of the present invention.

The Internet broadcast system of the fourth embodiment comprises one or more video file providing apparatuses 1201 and a plurality of video receiving/reproducing apparatuses 902, each of which is connected to the one or more video file providing apparatuses 1201 via the Internet 203.

The video file providing apparatuses 1201 each include a mixed file storing unit 1203, a transfer instruction judging unit 1204, a table reading unit 1205, a mixed file analyzing unit 1206, a table transmitting unit 1207, a video data reading unit 1208, and a video data transmitting unit 1209.

The video receiving/reproducing apparatuses 902 has the same construction as in the above-described third embodiment.

The mixed file storing unit 1203 stores a plurality of mixed files 1202 that each contain a video reproduction table and a video data sequence into which a plurality of sets of sectional video data are combined. The mixed file storing unit 1203 also stores a plurality of table files 209 and video files 204 (not shown in FIG. 12), which are basically the same as those stored in the table file storage 904 and the video file storage 903 of the third embodiment, respectively. These files 1202, 209 and 204 are identified by each file name and a site name of the video file providing apparatus 1201.

The transfer instruction judging unit 1204 receives a video transfer instruction or a table transfer instruction from the video transfer instruction transmitting unit 216 or the table transfer instruction transmitting unit 909, respectively, of one of the video receiving/reproducing apparatus 902, and judges if the received transfer instruction is a video transfer instruction or a table transfer instruction. A video transfer instruction contains a file name of one of the mixed files 1201, a read-start frame number, and a number of reading frames, whereas a table transfer instruction only contains a file name of one of the mixed files 1202. When the transfer instruction judging unit 1204 judges that the received transfer instruction is a table transfer instruction, the transfer instruction judging unit 1204 sends the received table transfer instruction to the table reading unit 1205. When the transfer instruction judging unit 1204 judges that the received transfer instruction is a video transfer instruction, the transfer instruction judging unit 1204 sends the video transfer instruction to the video data reading unit 1208.

The table reading unit 1205 then sends a file name which is shown in the sent able transfer instruction to the mixed file analyzing unit 1206, receives a video eproduction table from the mixed file analyzing unit 1206, and sends the received video eproduction table and an IP address of the video receiving/reproducing apparatus 902 which sent the received table transfer instruction to the table transmitting unit 1207.

The mixed file analyzing unit 1206 receives the file name from the table reading unit 1206, reads a mixed file that is specified by the file name from among the plurality of mixed files 1202 from the mixed file storing unit 1203, analyzes the read mixed file so as to generate a video reproduction table, and sends the generated video reproduction table to the table reading unit 1205.

The mixed file analyzing unit 1206 also receives reproduction information, which contains a file name, a read-start frame number, and a number of reading frames, from the video data reading unit 1208. The mixed file analyzing unit 1206 then reads a mixed file that is specified by the file name from the mixed file storing unit 1203, analyzes the read mixed file, and extracts sectional video data from a video data sequence in the analyzed mixed file. The mixed file analyzing unit 1206 then sends the extracted sectional video data to the video data reading unit 1208.

The table transmitting unit 1207 transmits the video reproduction table via the Internet 203 to the video receiving/reproducing apparatus 902 which sent the table transfer instruction.

The video data reading unit 1208 sends reproduction information which is contained in the video transfer instruction to the mixed file analyzing unit 1206. Upon receiving the sectional video data from the mixed file analyzing unit 1206, the video data reading unit 1208 sends the received sectional video data and the IP address of the video receiving/reproducing apparatus 902 which sent the video transfer instruction to the video data transmitting unit 1209.

The video data transmitting unit 1209 transmits the sectional video data to the video receiving/reproducing apparatus 902 which sent the video transfer instruction via the Internet 203.

Figure 13:
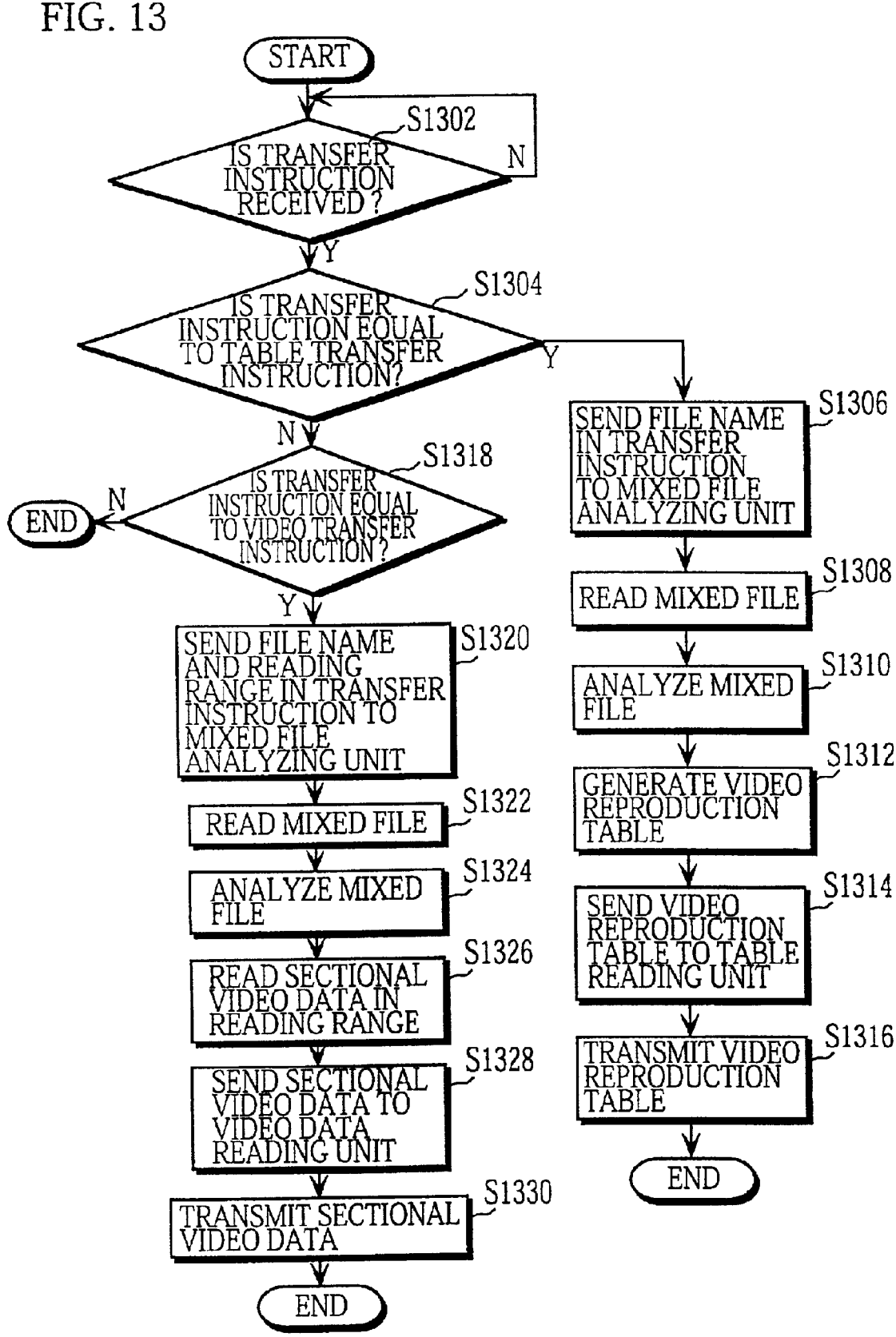
FIG. 13 is a flowchart showing the processing of a video file providing apparatus of the fourth embodiment.

The processing of the video file providing apparatus 1201 of the fourth embodiment will now be described with reference to the flowchart of FIG. 13.

The transfer instruction judging unit 1204 waits until it receives a transfer instruction from one of the video receiving/reproducing apparatuses 902 via the Internet 203 (step S1302), and judges if the transfer instruction is a table transfer instruction (step S1304). If the transfer instruction judging unit 1204 judges that the transfer instruction is a table transfer instruction, the transfer instruction judging unit 1204 sends the table transfer instruction to the table reading unit 1205.

The table reading unit 1205 then sends a file name that is contained in the table transfer instruction to the mixed file analyzing unit 1206 (step S1306).

The mixed file analyzing unit 1206 reads a mixed file that is specified by the sent file name from the mixed file storing unit 1203 (step S1308), analyzes the read mixed file (step S1310), and generates a video reproduction table (step S1312).

The mixed file analyzing unit 1206 then sends the generated video reproduction table to the table reading unit 1205 (step s1314).

The table transmitting unit 1207 transmits the video reproduction table, which is sent from the table reading unit 1205, to the video receiving/reproducing apparatus 902 which sent the received table transfer instruction (step S1316), which terminates the processing of the video file providing apparatus 1201.

In step S1304, if the transfer instruction judging unit 1204 judges that the sent transfer instruction is not a table transfer instruction, the transfer instruction judging unit 1204 further judges if the transfer instruction is a video transfer instruction (step S1318). If the transfer instruction judging unit 1204 judges that that transfer instruction is a video transfer instruction, the transfer instruction judging unit 1204 sends the judged transfer instruction to the video data reading unit 1208. On the other hand, if the transfer instruction judging unit 1204 judges that the transfer instruction is not a video transfer instruction, the processing of the video file providing apparatus 1201 is terminated.

The video data reading unit 1208 sends a file name, a read-start frame number, and a number of reading frames, all of which are shown in the video transfer instruction, to the mixed file analyzing unit 1206 (step S1320).

The mixed file analyzing unit 1206 reads a mixed file that is specified by the sent file name from the mixed file storing unit 1203 (step s1308), analyzes the read mixed file (step S1310), and extracts sectional video data that is specified by the sent read-start fame number and number of reading frames (step S11326).

The mixed file analyzing unit 1206 sends the extracted sectional video data to the video data reading unit 1208 (step S11328).

The video data transmitting unit 1209 receives the sectional video data from the video data reading unit 1208, and sends the received sectional video data to the video receiving/reproducing apparatus 902 which sent the video transfer instruction (step S11330). This terminates the processing of the video file providing apparatus 1201.

Fifth Embodiment

Figure 14:
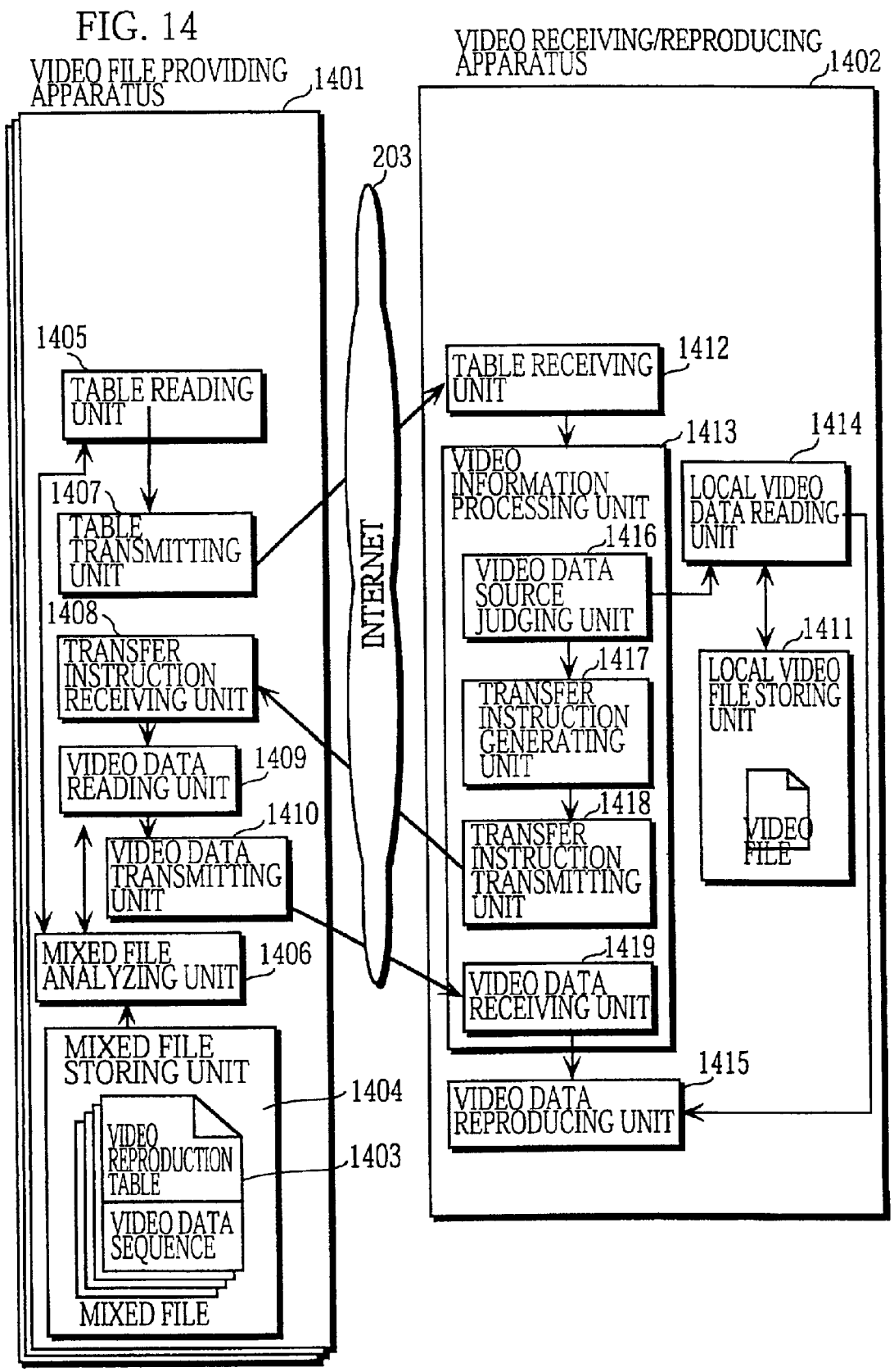
FIG. 14 shows a construction of an Internet broadcast system according to the fifth embodiment of the present invention.

FIG. 14 shows a construction of an Internet broadcast system according to the fifth embodiment of the present invention.

The Internet broadcast system of the fifth embodiment comprises one or more video file providing apparatuses 1401 and a video receiving/reproducing apparatus 1402 which are connected via the Internet 203.

The video file providing apparatus 1401 includes a mixed file storing unit 1404 that stores a plurality of mixed files 1403, a table reading unit 1405, a mixed file analyzing unit 1406, a table transmitting unit 1407, a transfer instruction receiving unit 1408, a video data reading unit 1409, and a video data transmitting unit 1410.

The mixed files 1403 of the fifth embodiment have the same construction as the mixed files 1202 of the fourth embodiment. An example of a mixed file that has a file name "ePackage.xml" is shown in FIG. 15.

The mixed file 1501 is written in extended XML (extensible markup Language), which is one type of a markup language. XML is described in detail in "Hyojun XML Kanzen Kaisetsu (Complete Guide for Standard XML)" ISBN 4-7741-0584-8C3055, 1998, Gijyutsu-Hyoron Co., Ltd.

The following describes the contents of the mixed file 1501.

The first line 1502 in FIG. 15 represents a name of a markup language and the version thereof which is used for the mixed file 1501. "AVXML" means that XML which is used for this file 1501 supports "AV" (audio-video) data, and the version of this "AVXML" format is shown as "version= 1.0". Hereafter, a mixed file in this format is called an AVXML file.

A document portion between a mark 1503"[>" and a mark 1504"]>" defines a "document type" in AVXML. The document type represents a format type of data that is written in markup language. In the example of FIG. 15, terms to be used in a document portion that is tagged by "videoprogram" are defined.

The third and fourth lines 1505 define that a term "VIDEO 1" represents video data by using an identifier "VIDEOCUT-LIST". More specifically, an identifier "self" shows that the video data that is represented by "VIDEO 1" is stored within this AVXML file 1501. These lines 1505 also show that this video data is contained in a video data sequence titled "Osaka, raining", and is specified by time codes "00:00:30:00" and "00:01:30:00". These time codes show that this video data corresponds to a one-minute piece of video data in the above-described video data sequence and that this piece of video data would be reproduced when 30 seconds have passed since the start of a reproduction of the video data sequence. The reproduction of this piece of video data would end after 90 seconds have passed since the start of the reproduction of the video data sequence.

Similarly, the fifth and sixth lines 1506 define that the term "VIDEO2" represents video data. More specifically, an identifier "external" shows that this video data is stored in a video file providing apparatus which is different from the video file providing apparatus storing this AVXML file 1501. The subsequent text "avxml://www.x.com/ live from Tokyo" shows that this video data "VIDEO2" is contained in an AVXML file titled "live from Tokyo" in a Web site which is specified by a site name of "www.x.com". The video data "VIDEO2" is assigned time codes "00:01:00:00" and "00:03:00:00", which means that this video data corresponds to a two-minute piece of video data in the file titled "live from Tokyo" and that this piece of video data would be reproduced when one minute has passed since the start of a reproduction of the file "live from Tokyo". The reproduction of this piece of video data would end after three minutes have passed since the start of the reproduction of the file "live from Tokyo".

Similarly, the seventh and eighth lines 1507 define that a term "VIDEO3" represents video data. More specifically, an identifier "local" shows that this video data is stored in a video file in a local video file storing unit 1411 of the video receiving/reproducing apparatus 1402 which is going to receive this AVXML file 1501. The subsequent text "D:/ news repeat" shows that this video file is titled as "news repeat" and stored in a medium which is specified by a name "D" drive of the video receiving/reproducing apparatus 1402. The video data "VIDEO3" is assigned time codes "00:00:00:00" and "00:02:00:00" which means that this video data corresponds to a two-minute piece of video data in the file titled "news repeat" and that this piece of video data would be reproduced when zero seconds have passed since the start of a reproduction of the file "live from Tokyo". The reproduction of this piece of video data would end after two minutes have passed since the start of the reproduction of the file "news repeat".

A document portion between the tenth line 1508 and the 34th line 1509 are tagged by tags "videoprogram", and expresses information for a video reproduction table and video data. The 11th line 1510 shows that the name of this video reproduction table and a video program corresponding to the video reproduction table is "today's weather forecast", and the 12th line 1511 contains a time code "00:05:00:00", which indicates that this video program has a reproduction duration of five minutes.

A document portion between the 13th line 1512 and the 23rd line 1513 is tagged by tags "VIDEO REPRODUCTION TABLE", which indicates that the tagged portion is information regarding the video reproduction table, and the information shows how different sets of (sectional) video data are combined so as to form the video program "today's weather forecast".

A document portion between the 14th line 1514 and the 16th line 1515, a document portion between the 17th line 1516 and the 19th line 1517, and a document portion between the 20th line and the 22nd line 1519 are tagged by tags "videocut", which indicates video data. These three document portions specify different video data by quoting the aforementioned identifiers "VIDEO1", "VIDEO2", and "VIDEO3" in the 15th line 1520, 18th line 1512, and 21st line 1522, respectively.

This is to say, a document portion between the 13th line 1512 and the 22nd line 1513 indicates that the following sets of sectional video data are reproduced sequentially as the video program "today's weather forecast": the one-minute video data contained in the video data sequence "Osaka, Raining" in this AVXML file 1501; the two-minute video data contained in the video file "live from Tokyo" in the Web site "www.x.com"; and the two-minute video data which is contained in the video file "news repeat" in the video receiving/reproducing apparatus 1402. Accordingly, in sum, this video program has a reproduction duration of five minutes.

A document portion between the 24th line 1523 and the 33rd line 1524 describes the video data sequence. The 25th line 1525 shows that the name of this video data sequence is "Osaka, raining", and the 26th line 1526 shows a time code of "00:02:00:00" as a duration of this video data sequence, that is, two minutes. The 27th and 28th lines 1527 and 1528 show time codes of "00:00:00:00" and "00:02:00:00", respectively, which are assigned to the first frame and the last frame of the video data sequence. The 29th line 1529 shows that each frame that makes up the video data sequence is encoded according to "JPEG Interchange Format".

A document portion between the 30th line 1523 and the 32nd line 1531 is tagged by "videocontents", which indicate that the tagged document portion contains an actual video data sequence. In the example of FIG. 15, the actual video data sequence is stored in a portion 1532 as binary data. Note that this binary data may be written in the ASCII (American Standard Code for Information Interchange) format.

The table reading unit 1405 designates a file name of one of the plurality of mixed files 1403, and instructs the mixed file analyzing unit 1406 to generate a video reproduction table, referring to a mixed file which is specified by the designated file name and stored in the mixed file storing unit 1404. Upon receiving the generated video reproduction table from the mixed file analyzing unit 1406, the table reading unit 1405 sends the video reproduction table to the table transmitting unit 1407, and instructs the table transmitting unit 1407 to transmit the video reproduction table to every video receiving/reproducing apparatus 1402 at predetermined intervals over a predetermined period such as at intervals of ten minutes from 12:00 p.m. to 12:00 a.m., for instance. This can be achieved by Internet broadcast technology or Internet multicast technology.

The mixed file analyzing unit 1406 receives the instruction to generate the video reproduction table from the table reading unit 1405, reads the mixed file that is specified by the designated file name from the mixed file storing unit 1404, analyzes the read mixed file, and generates the video reproduction table.

For instance, when the table reading unit 1405 designates a file name "ePackage.xml" of a mixed file, and instructs the generation of a video reproduction table, the mixed file analyzing unit 1406 reads the AVXML file 1501 that is shown in FIG. 15, analyzes a document portion between tags "video reproduction table" 1512 and 1513 in the AVXML file 1501, and generates a video reproduction table. When generating, as part of this video reproduction table, reproduction information for sectional video data that is specified by the identifier "self", the mixed file analyzing unit 1406 writes "www.y.com", which is a site name specifying the video file providing apparatus 1401, as a site name, and writes "ePackage.xml" as a file name. Further, the mixed file analyzing unit 1406 writes "today's weather forecast", which is shown in the 11th line 1510 in a "title" tag in the AVXML file 1501, as a table file name specifying video data corresponding to this video reproduction table.

As a result, the mixed file analyzing unit 1406 generates a video reproduction table 1601 as shown in FIG. 16, and sends the generated video reproduction table 1601 to the table reading unit 1405.

Note that reproduction information in the video reproduction table for the fifth embodiment specifies sectional video data by a start time code and an end time code, instead of by a read-start frame number 306 and a number of reading frames 307 as in the first to the fourth embodiments.

Moreover, the mixed file analyzing unit 1406 receives a file name, a start time code, and an end time code from the video data reading unit 1409, reads a mixed file that is specified by the received file name from the mixed file storing unit 1404, analyzes the read mixed file, and reads sectional video data that is specified by the received start time code and end time code from a video data sequence in the read mixed file. The mixed file analyzing unit 1406 then sends the read sectional video data to the video data reading unit 1409.

For instance, when the video data reading unit 1409 has received a transfer instruction for sectional video data with a reproducing order "1" in the video reproduction table 1601, the mixed file analyzing unit 1406 reads sectional video data in the two-minute long video data sequence (i.e., the binary data 1532) "Osaka, raining" between "video data sequence" tags 1523 and 1524 in the AVXML file 1501.

In accordance with the instruction from the table reading unit 1405, the table transmitting unit 1407 transmits the generated video reproduction table to every video receiving/reproducing apparatus 1402 via the Internet 203 at predetermined intervals over the predetermined period.

The transfer instruction receiving unit 1408 receives a transfer instruction from the video receiving/reproducing apparatus 1402, and sends the received transfer instruction to the video data reading unit 1409.

The video data reading unit 1409 receives the sent transfer instruction, and sends a file name, a start time code and an end time code in the received transfer instruction to the mixed file analyzing unit 1406. When the video data reading unit 1409 receives sectional video data from the mixed file analyzing unit 1406, the video data reading unit 1409 sends the received sectional video data together with an IP address, which is shown in the above-described video transfer instruction, of the video receiving/reproducing apparatus 1402 to the video data transmitting unit 1410.

The video data transmitting unit 1410 transmits the sent sectional video data via the Internet 203 to the video data receiving/reproducing apparatus 1402 that sent the video transfer instruction.

The video receiving/reproducing apparatus 1402 includes a local video file storing unit 1411, a table receiving unit 1412, a video information processing unit 1413, a local video data reading unit 1414, and a video data reproducing unit 1415. The video information processing unit 1413 contains a video data source judging unit 1416, a transfer instruction generating unit 1417, a transfer instruction transmitting unit 1418, and a video data receiving unit 1419.

The local video file storing unit 1411 stores a video file which stores different sets of sectional video data consecutively. Each set of the sectional video data is combined with video data that is sent from the video file providing apparatus 1401 to be reproduced.

The table receiving unit 1412 receives a video reproduction table from the video file providing apparatus 1401, and has a display unit (not shown in FIG. 14) for displaying a name that specifies video data corresponding to the received video reproduction table. When the user wishes to watch this video data and has a specifying unit (not shown in FIG. 14) for selecting the video data name, the table receiving unit 1412 sends the received video reproduction table to the video data source judging unit 1416 in the video information processing unit 1413.

The video data source judging unit 1416 reads a set of reproduction information for sectional video data with the earliest reproducing order, and judges if this sectional video data is stored in the local video file storing unit 1411 by judging if a site name in the read reproduction information is shown as "local". If the video data source judging unit 1416 judges that the sectional video data is not stored in the local video file storing unit 1411, the video data source judging unit 1416 sends the read reproduction information to the transfer instruction generating unit 1417. On the other hand, if the video data source judging unit 1416 judges that the sectional video data is stored in the local video file storing unit 1411, the video data source judging unit 1416 sends the reproduction information to the local video data reading unit 1414.

For instance, when the video data source judging unit 1416 receives the video reproduction table 1601 that is shown in FIG. 16, the video data source judging unit 1416 sends two sets of reproduction information with the reproducing orders "1" and "2" to the transfer instruction generating unit 1417, and sends a set of reproduction information with the reproducing order "3" to the local video data reading unit 1414.

The transfer instruction generating unit 1417 receives a set of reproduction information for sectional video data from the video data source judging unit 1416, and generates a transfer instruction which is composed of an IP address of the video receiving/reproduction apparatus 1402, a file name, a start time code, and an end time code which are shown in the received reproduction information. The transfer instruction generating unit 1417 then sends the generated transfer instruction, together with a site name, to the transfer instruction transmitting unit 1418.

The transfer instruction transmitting unit 1418 transmits this video transfer instruction to a video file providing apparatus 1401 which is specified by the site name that is shown in the video transfer instruction via the Internet 203.

The video data receiving unit 1419 receives the sectional video data from the video data transmitting unit 1410 of the video file providing apparatus 1401 via the Internet 203, and sends the received sectional video data to the video data reproducing unit 1415.

The local video data reading unit 1414 receives reproduction information for sectional video data from the video data source judging unit 1416, and reads the sectional video data that is specified by a start time code and an end time code in the reproduction information from a video file, which is specified by the file name in the reproduction information and stored in the local video file storing unit 1411. The local video data reading unit 1414 sends the read sectional video data to the video data reproducing unit 1415.

The video data reproducing unit 1415 receives sectional video data from either the video data receiving unit 1419 or the local video data reading unit 1414, and reproduces and outputs the received sectional video data.

The processing of the Internet broadcast system of the fifth embodiment will now be described with reference to the flowcharts of FIGS. 17–19.

Figure 17:
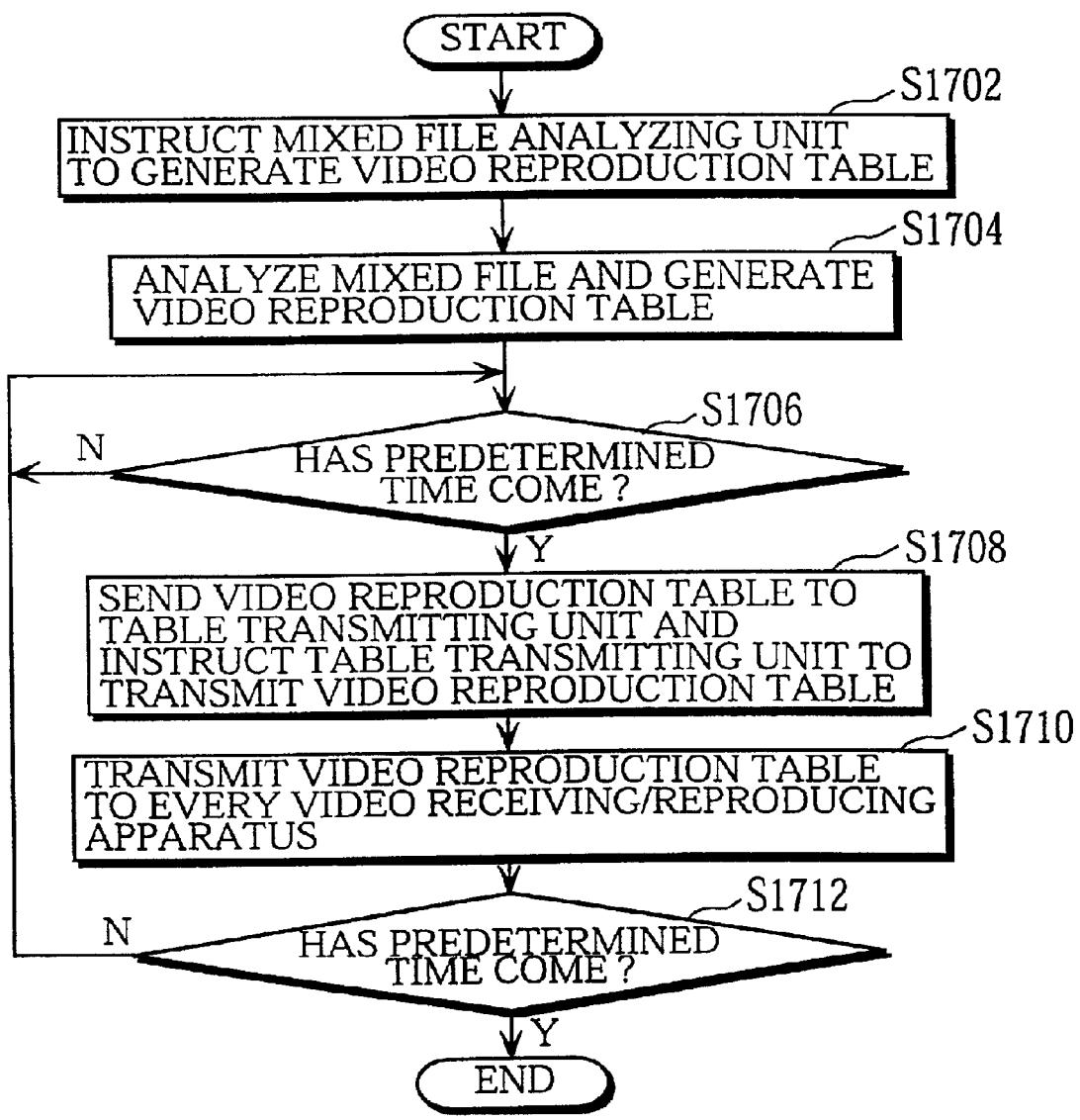
FIG. 17 is a flowchart showing the processing by a video file providing device of the fifth embodiment to transmit a video reproduction table.

FIG. 17 is a flowchart showing the processing to send a video reproduction table.

The table reading unit 1405 instructs the mixed file analyzing unit 1406 to generate a video reproduction table (step S1702).

The mixed file analyzing unit 1406 reads one of the plurality of mixed files 1403 from the mixed file storing unit 1404, analyzes the read mixed file, generates the video reproduction table, and sends the generated video reproduction table to the table reading unit 1405 (step S1704).

The table reading unit 1405 waits until a predetermined time (or a predetermined time after a predetermined interval) comes (elapses) (step S1706), sends the generated video reproduction table to the table transmitting unit 1407, and instructs the table transmitting unit 1407 to transmit the video reproduction table (step S1708).

The table transmitting unit 1407 transmits the video reproduction table to every video receiving/reproducing apparatus 1402 via the Internet 203 (step S1710).

The table reading unit 1405 then judges if a predetermined time, at which the transmission of the video reproduction table should be terminated, has come (step S1712). If the table reading unit 1405 judges that the predetermined has come, the processing to send the video reproduction table is terminated. On the other hand, if the table reading unit 1405 judges that the predetermined time has not yet come, the processing returns to step S1706.

Figure 18:
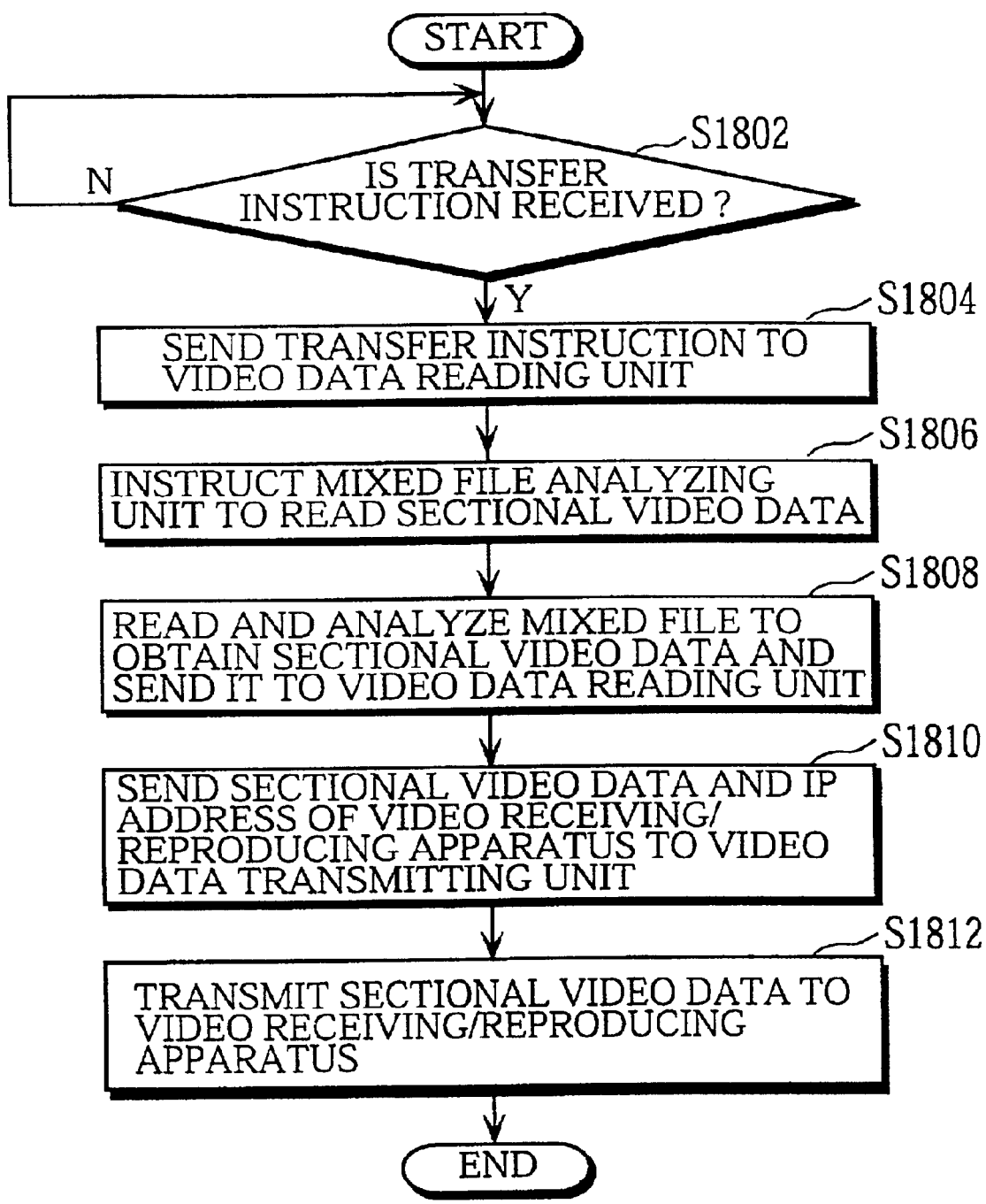
FIG. 18 is a flowchart showing the processing by the video file providing apparatus of the fifth embodiment to transmit sectional video data.

FIG. 18 is a flowchart showing the processing to send sectional video data.

The transfer instruction receiving unit 1408 waits until it receives a transfer instruction for sectional video data via the Internet 208 from the transfer instruction transmitting unit 1418 in the video receiving/reproducing apparatus 1402 (step S1802), and sends the received transfer instruction to the video data reading unit 1409 (step S1804).

In accordance with the sent transfer instruction, the video data reading unit 1409 instructs the mixed file analyzing unit 1406 to read the sectional video data (step S1806).

The mixed file analyzing unit 1406 reads a mixed file that is specified by a file name in the transfer instruction from the mixed file storing unit 1404, analyzes the read mixed file to obtain the sectional video data, and sends the obtained sectional video data to the video data reading unit 1409 (step S1808).

The video data reading unit 1409 sends this sectional video data together with an IP address of the above-described video receiving/reproducing apparatus 1402 to the video data transmitting unit 1410 (step S1810).

The video data transmitting unit 1410 transmits this sectional video data to the video receiving/reproducing apparatus 1402 (step S1812).

Figure 19:
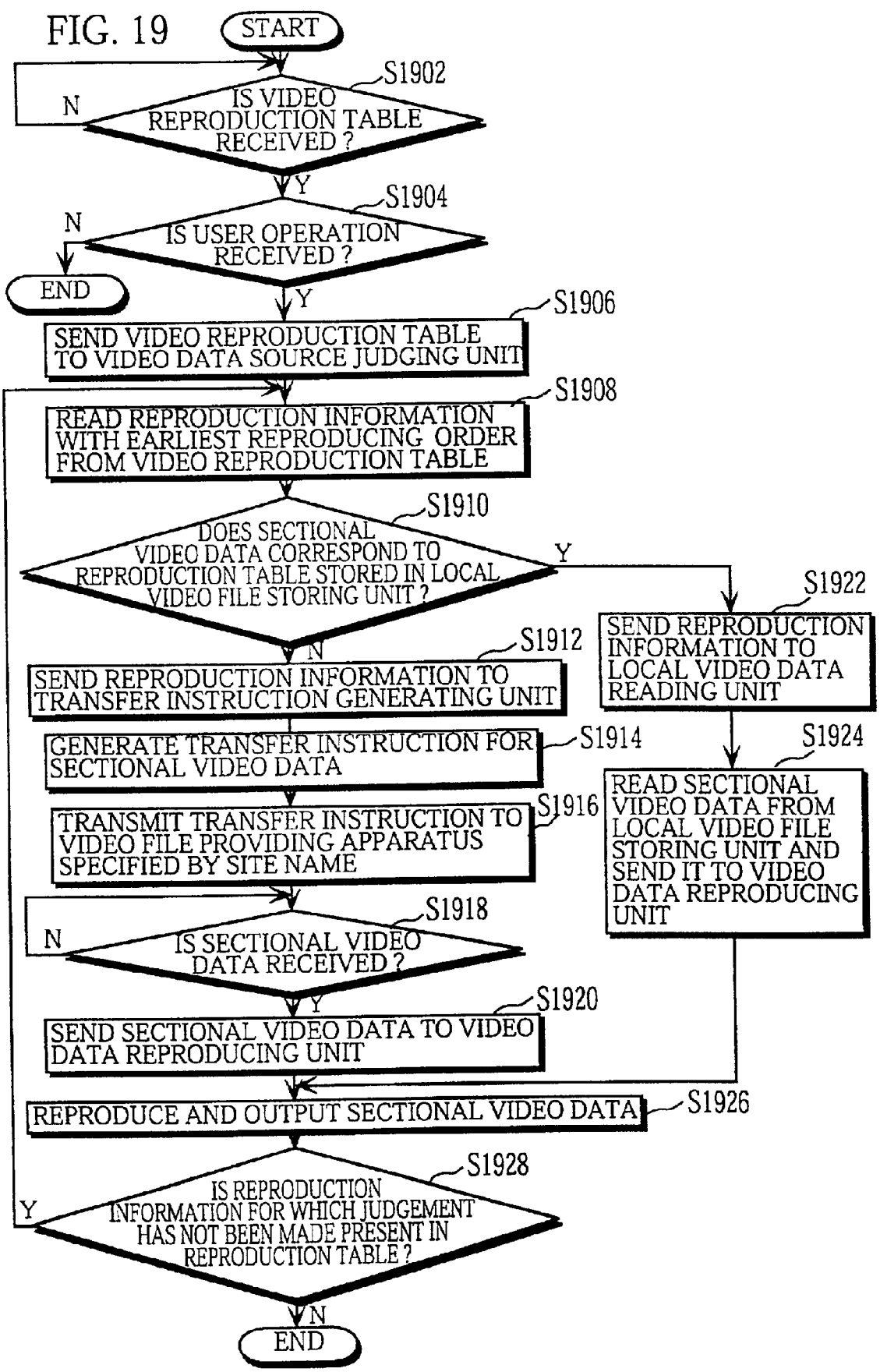
FIG. 19 is a flowchart showing the processing of a video receiving/reproducing apparatus of the fifth embodiment.

FIG. 19 is a flowchart showing the processing of the video receiving/reproducing apparatus 1402.

The table receiving unit 1412 waits until it receives a video reproduction table (step S1902), receives a user operation designating a file name that specifies video data corresponding to the received video reproduction table (step S1904), and sends the video reproduction table to the video data source judging unit 1416 (step S11906).

The video data source judging unit 1416 reads a set of reproduction information for sectional video data with the earliest reproducing order from this video reproduction table (step S1908), and judges if a site name that is shown in the read reproduction information is shown as "local" so as to judge if the sectional video data is stored in the local video file storing unit 1411 (step S1910).

If the video data source judging unit 1416 judges that the sectional video data is stored in the local video file storing unit 1411, the video data source judging unit 1416 sends this reproduction information to the transfer instruction generating unit 1417 (step S1912).

The transfer instruction generating unit 1417 generates a transfer instruction for the sectional video data, and sends the generated transfer instruction to the transfer instruction transmitting unit 1418 (step S1914).

The transfer instruction transmitting unit 1418 transmits the generated video transfer instruction via the Internet 203 to a video file providing apparatus 1401 which is specified by a site name that is shown in the transfer instruction.

The video data receiving unit 1419 waits until it receives the sectional video data (step S1918), and sends the received sectional video data to the video data reproducing unit 1415 (step S1920).

In step S1910, when the video data source judging unit 1416 judges that the sectional video data is stored in the local video filed storing unit 1411, the video data source judging unit 1416 sends the reproduction information to the local video data reading unit 1414 (step S1922).

In accordance with this reproduction information, the local video data reading unit 1414 reads the sectional video data from a video file in the local video file storing unit 1411, and sends the read sectional video data to the video data reproducing unit 1415 (step S1924).

The video data reproducing unit 1415 reproduces and outputs this sectional video data (step S1926).

The video data source judging unit 1415 judges if reproduction information for which the video data source judging unit 1415 has not made a judgement is present in the received video reproduction table (step S11928). If the video data source judging unit 1415 judges that there is no such reproduction information in the video reproduction table, the processing to receive sectional video data is terminated. On the other hand, if the video data source judging unit 1415 judges that such reproduction information that has not yet been judged is present in the video reproduction table, the processing returns to step S1908.

Sixth Embodiment

Figure 20:
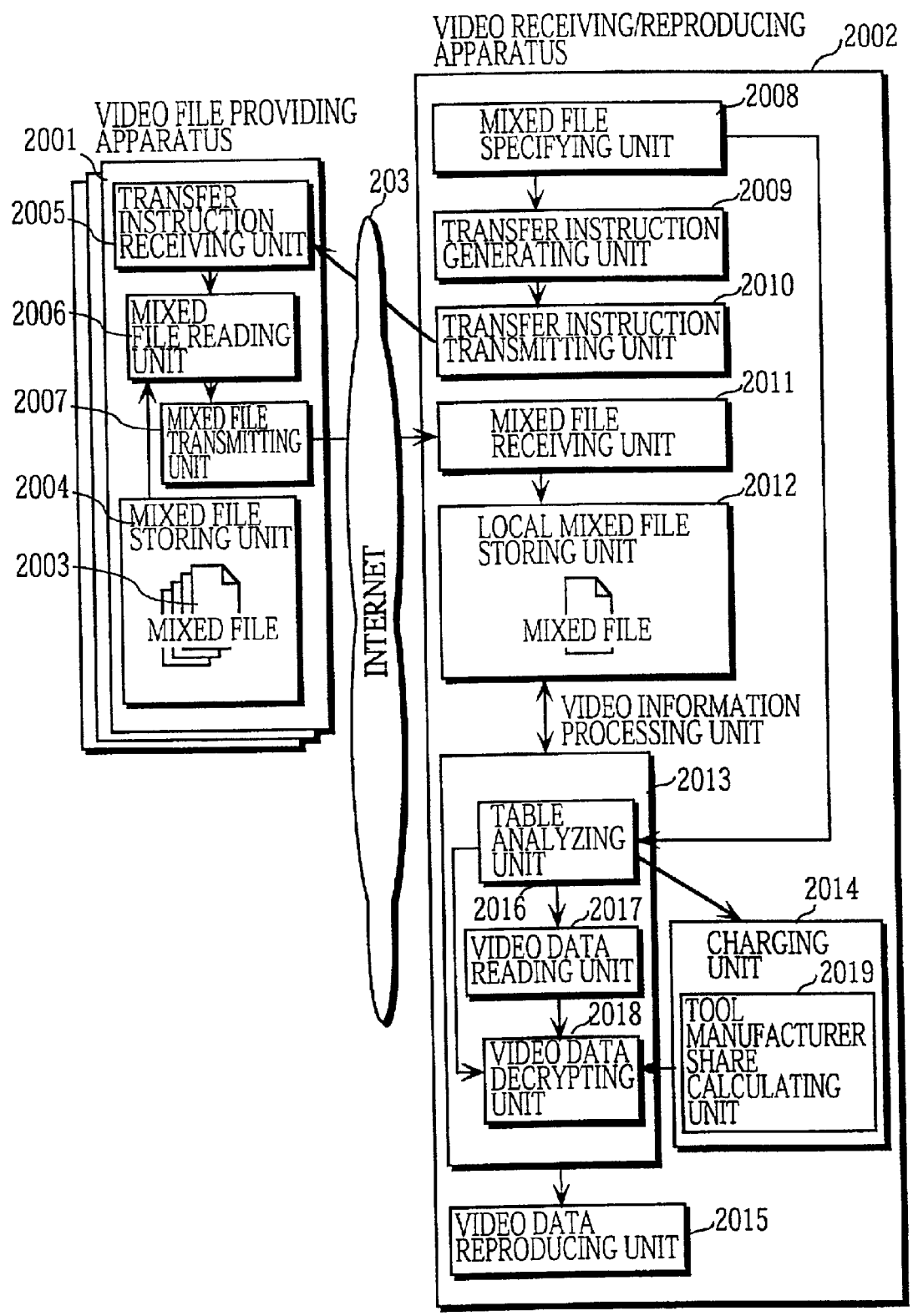
FIG. 20 shows a construction of an Internet broadcast system according to the sixth embodiment of the present invention.

FIG. 20 shows a construction of an Internet broadcast system according to the sixth embodiment of the present invention. The Internet broadcast system sixth embodiment comprises one or more video file providing apparatuses 2001 and a plurality of video receiving/reproducing apparatuses 2002, each of which is connected to the one or more video file providing apparatuses 2001 via the Internet 203.

The video file providing apparatus 2001 includes a mixed file storing unit 2004 that stores a plurality of mixed files 2003 containing encrypted video data sequences, a transfer instruction receiving unit 2005, and a mixed file reading unit 2006, and a mixed file transmitting unit 2007.

The mixed files 2003 each contain a plurality of video data sequences, which have the same construction as the video binary data that are stored in a mixed file of the above-described fifth embodiment but are different from the fifth embodiment in that the video data sequences that are contained in the mixed filed 2003 are encrypted. The mixed files 2003 also each contain information for a plurality of video reproduction tables. In this information, sets of sectional video data making up the encrypted video data sequences are shown as having a variety of reproducing orders.

FIG. 21 shows an example of a video reproduction table that is generated from the above-described information that is contained in the mixed file 2003.

The video reproduction table 2101 is generated for video data that is composed of two sets of sectional video data to be reproduced in a reproducing order 2103, and is associated with a video image name 2102.

Two sets of reproduction information 2104 for the two sets of sectional video data are written in the reproducing order 2103 as in the first to fifth embodiments.

A site name 2105 is shown as "WITHIN ITS OWN FILE" which means that sectional video data that is specified by each set of reproduction information is stored in the video receiving/reproducing apparatus 2002 as shown by the identifier "local" in the fifth embodiment.

A data sequence name 2106 identifies one of the plurality of video data sequences that are stored in the mixed files 2003.

A reproduction start time code 2107 and a reproduction duration time code 2108 specify a range in which the sectional video data is present in a video data sequence. This is to say, the sectional video data corresponds, in the video data sequence, to video data that would be reproduced when a time that is shown by the start time code 2107 has passed since the start of a reproduction of the video data sequence and that has a reproduction duration that is shown by the reproduction duration time code 2108.

An encrypted data key 2109 is encrypted in the video reproduction table 2101, and is decrypted when being used to decrypt the sectional video data.

This video reproduction table 2101 also shows a reproduction fee 2110, a tool manufacturer identifier 2111, and a tool manufacturer share rate 2112.

The reproduction fee 2110 shows a fee which is charged when all the video data that is specified by this reproduction table 2101 is reproduced. In the example of FIG. 21, the reproduction fee 2110 is shown as "200 YEN".

The tool manufacturer identifier 2111 shows a manufacturer of a production tool that is used for generating a mixed file 2003 which contains information for the video reproduction table 2101 and video data sequences. In the example of FIG. 21, the tool manufacturer identifier 2111 is shown as "XXXX ELECTRIC INDUSTRIAL Co., Ltd.".

The tool manufacturer share rate 2112 shows a rate of share to be distributed, out of the reproduction fee 2110, to the tool manufacturer which is specified by the above-described identifier 2111. In the example of FIG. 21, the share rate 2112 is shown as "20%".

The mixed file storing unit 2004 stores the plurality of mixed files 2003.

The transfer instruction receiving unit 2005 receives, from one of the video receiving/reproducing apparatuses 2002, a transfer instruction to have a mixed file transferred, and sends the received transfer instruction to the mixed file reading unit 2006.

The mixed file reading unit 2006 reads the mixed file that is specified by the received transfer instruction from the mixed file storing unit 2004, and sends the read mixed file to the mixed file transmitting unit 2007. Together with this read mixed file, the mixed file reading unit 2006 also sends an IP address, which is shown in the received transmission instruction, of the video receiving/reproducing apparatus 2002 which sent the received transfer instruction.

The mixed file transmitting unit 2007 transmits the sent mixed file to the IP address of this video receiving/reproducing apparatus 202 via the Internet 203.

The video receiving/reproducing apparatuses 2002 each include a mixed file specifying unit 2008, a transfer instruction generating unit 2009, a transfer instruction transmitting unit 2010, a mixed file receiving unit 2011, a local mixed file storing unit 2012, a video information processing unit 2013, a charging unit 2014, and a video data reproducing unit 2015. The video data processing unit 2013 includes a table analyzing unit 2016, a video data reading unit 1027, and a video data decrypting unit 2018.

The mixed file specifying unit 2008 receives a user operation that designates a video image name which is associated with a video reproduction table. The mixed file specifying unit 2008 performs this operation, for instance, by having a display unit (not shown in FIG. 20) display a menu that is composed of file names of mixed files, and video image names that are associated with video reproduction tables which are contained in these mixed files so as to allow the user to designate one video image name. This menu may be stored in a recording medium so as to be distributed to the video receiving/reproducing apparatus 2002 in advance, or the menu may be obtained by having the video receiving/reproducing apparatus 2002 access a Web site which is provided by the video file providing apparatus 2001 or other providers.

Upon receiving the designation of the video image name, the mixed file specifying unit 2008 sends the designated video image name to the table analyzing unit 2016 in the video information processing unit 2013, and sends a file name of a mixed file that contains information for a video reproduction table which is associated with the designated video image name to the transfer instruction generating unit 2009.

The transfer instruction generating unit 2009 stores, in advance, a plurality of file names of mixed files and a plurality of site names of video file providing apparatuses 2001 which are associated with these site names. Upon receiving the file name of the mixed file from the mixed file specifying unit 2008, the transfer instruction generating unit 2009 generates a transfer instruction which contains the received file name and an IP address of the video receiving/reproducing apparatus 2002. The transfer instruction generating unit 2009 then sends the generated transfer instruction together with a site name of a video file providing apparatus 2001 which stores the mixed file to the transfer instruction transmitting unit 2010.

The transfer instruction transmitting unit 2010 then transmits this transfer instruction to the video file providing apparatus 2001 that is specified by the site name via the Internet 203.

The mixed file receiving unit 2011 receives the mixed file from the video file providing apparatus 2001, and writes the received mixed file into the local mixed file storing unit 2012.

The local mixed file storing unit 2012 is achieved by a hard disk, DVD-RAM, or the like, and stores the mixed file.

The table analyzing unit 2016 receives the video image name from the mixed file specifying unit 2008, waits until the above-described mixed file is written into the local mixed file storing unit 2012, reads the mixed file, and analyzes the read mixed file. Based on this mixed file, the table analyzing unit 2016 generates a video reproduction table which is associated with the video image name that is sent from the mixed file specifying unit 2008, and sends the generated video reproduction table to the video data reading unit 2017, the video data decrypting unit 2018, and the charging unit 2014.

The video data reading unit 2017 refers to the sent video reproduction table, and reads a set of sectional video data with the earliest reproducing order from the local mixed file storing unit 2012 in accordance with reproduction information for this set of sectional video data. This set of sectional video data is encrypted. The video data reading unit 2017 then sends the read set of sectional video data to the video data decrypting unit 2018.

The video data decrypting unit 2018 receives the video reproduction table from the table analyzing unit 2016, and then receives a charging key from the charging unit 2014. The video data decrypting unit 2018 then decrypts the encrypted data key in the reproduction table so as to obtain a decrypted data key. Using this decrypted data key, the video data decrypting unit 2018 decrypts the encrypted sectional video data, which has been sent from the video data reading unit 2017, obtains decrypted sectional video data, and sends the decrypted sectional video data to the video data reproducing unit 2015.

The charging unit 2014 stores the above-described charging key in advance, and contains a tool manufacturer share calculating unit 2019. Upon receiving the video reproduction table from the table analyzing unit 2016, the charging unit 2014 charges a reproduction fee to the user.

For instance, when receiving the video reproduction table 2101 that is shown in FIG. 21, the charging unit 2014 charges the reproduction fee 210 of "200 YEN", and then sends the charging key of, for instance, "pgrs" to the video data decrypting unit 2018. Using this "pgrs" charging key, the video data decrypting unit 2018 decrypts an encrypted data key "hkdfhdsfns" which is associated with reproduction information for the sectional video data with the reproducing order "1" so as to generate a decrypted data key "12345678". Similarly, the video data decrypting unit 2018 decrypts, with the "pgrs" charging key, an encrypted data key "Njdkvmkfd:" which is associated with the reproducing order "2" so as to generate a decrypted data key "87654321".

The tool manufacturer share calculating unit 2019 then multiplies the reproduction fee 2110 by the tool manufacturer share rate 2112 so as to generate a share, and stores the generated share with the tool manufacturer identifier 2111. In the example of FIG. 21, the reproduction fee 2110 of "200 yen" is multiplied by the share rate 2112 of "20%" so as to generate a share of 40 yen (=200 yen×20/100) to the "XXXX ELECTRIC INDUSTRIAL Co., Ltd.". The charging unit 2014 notifies a charging center (not shown in FIG. 20) of a credit card company of the generated share and the reproduction fee 2110 via the Internet 203 so that a predetermined share is paid to a provider of a mixed file and a tool manufacturer via the credit card company, or via electronic money such as bit cash and web money.

The video data reproducing unit 2015 receives decrypted sectional video data from the video data decrypting unit 2018, and reproduces and outputs this received video data.

Figure 22:
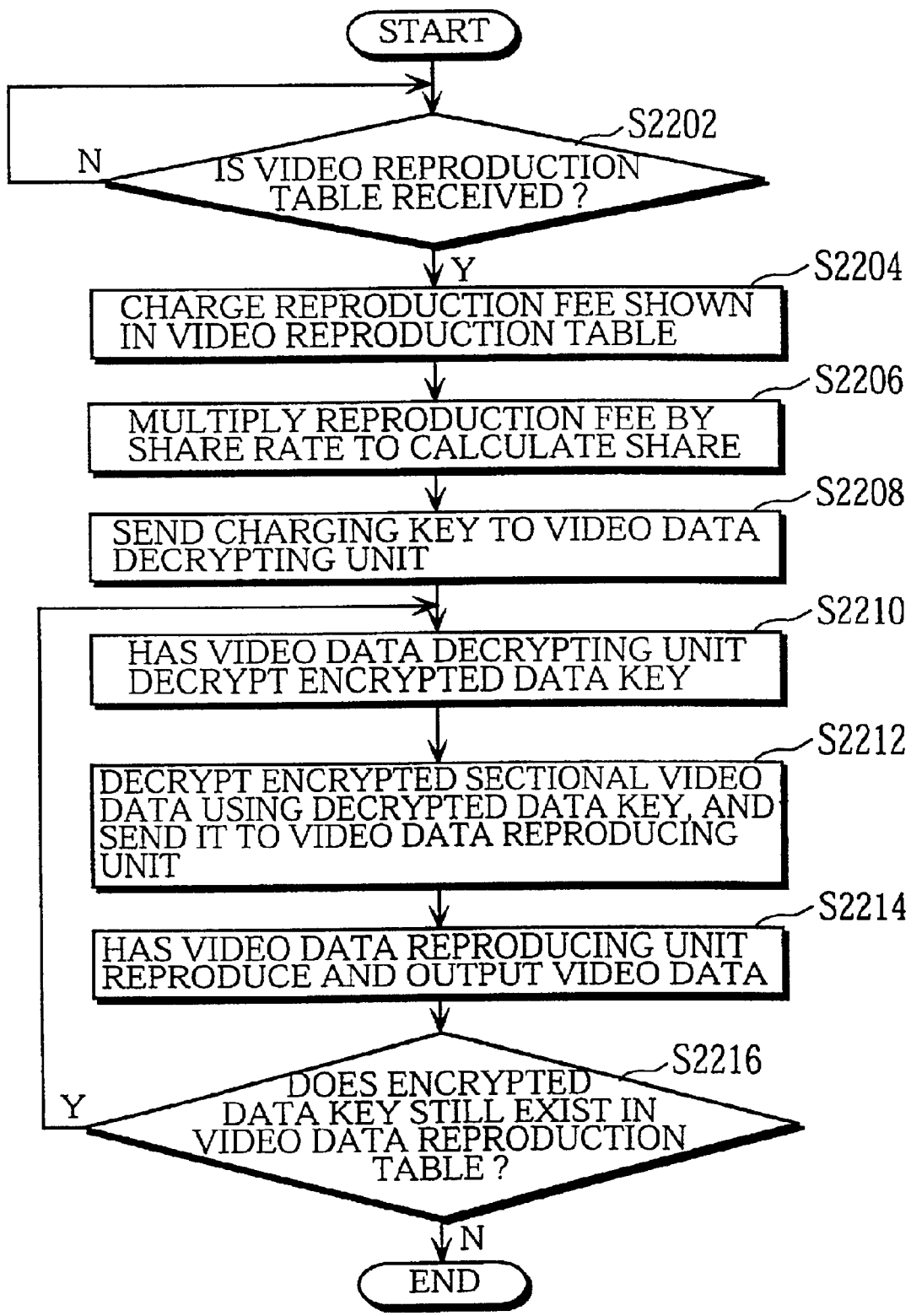
FIG. 22 is a flowchart showing the main processing of the sixth embodiment.

The processing of the charging unit 2014 in the video receiving/reproducing apparatus 2002 will now be described with reference to the flowchart of FIG. 22 based on the assumption that the charging unit 2014 receives the video reproduction table 2101.

The charging unit 2014 waits until it receives a video reproduction table 2101 (step S2202), and charges a reproduction fee 2110 that is shown in the video reproduction table 2110 (step S2204).

The tool manufacturer share calculating unit 2019 multiplies the reproduction fee 2110 by the tool manufacturer share rate 2112 so as to generate a share, and writes the generated share together with the tool manufacturer ID 2111 (step S2206).

The charging unit 2014 then sends the charging key to the video data decrypting unit 2018 (step S2208).

The video data decrypting unit 2018 reads an encrypted data key 2109 which is associated with the earliest reproducing order 2103 from the video reproduction table 2101, and decrypts the encrypted data key 2109 with the sent charging key so as to generate a decrypted data key (step S2210). Using this decrypted data key, the video data decrypting unit 2018 decrypts encrypted sectional video data, which has been sent from the video data reading unit 2017, so as to generate decrypted sectional video data, and sends the decrypted sectional video data to the video data reproducing unit 2015 (step S2212).

The video data reproducing unit 2015 reproduces and outputs the received decrypted sectional video data (step S2214).

The charging unit 2014 then judges if an encrypted data key 2109 still exists in the video reproduction table 2101 (step S2216). If the charging unit 2014 judges that an encrypted data key 2109 does not exist in the video reproduction table 2101, the charging unit 2014 terminates the processing. On the other hand, if the charging unit 2014 judges that an encrypted data key 2109 still exists in the video reproduction table 2101, the processing returns to step S2210.

Note that descriptions of operations such as by the video receiving/reproducing apparatus 2002 to receive a mixed file and by the video file providing apparatus 2001 to send a mixed file are omitted as they are basically the same as in the above-described embodiments.

In the sixth embodiment, the tool manufacturer share calculating unit 2019 calculates the share that is to be distributed to the tool manufacturer according to the share rate which is written in the video reproduction table. However, instead of this share rate, the reproduction table may contain a formula which is to be used to calculate the share that is to be distributed to the tool manufacturer. For instance, this formula may be as follows:

> share distributed to tool manufacturer=degree of newness*1 yen+ 350 yen, wherein the degree of newness is larger than zero and satisfies the following equation:

> degree of newness=100−(the number of days between a date on which the mixed file is downloaded and a date on which the mixed file is released).

Consequently, the degree of newness becomes high when the mixed file has been downloaded soon after the mixed file was released. When the mixed file is downloaded after 100 days or longer have passed since the released date, the share to the tool manufacturer is calculated regardless of the degree of newness.

The sixth embodiment states that a fee which is equal to a reproduction fee minus a calculated share is distributed to a producer of a mixed file. However, this fee may be paid to a retail dealer or the like who electrically sells the mixed file.

In the above-described embodiments, a video receiving/reproducing apparatus and a video file providing apparatus according to the present invention are described as having constructions as shown in the drawings such as FIG. 2. However, it is possible to record, onto a computer-readable recording medium, the processing so as to have a computer perform the processing of elements which are shown in these drawings, and to have this recording medium be used by an apparatus which does not have a function to reproduce sets of sectional video data in an assigned reproducing order. With this method, the same effects as those obtained by the present invention can be achieved.

In the above-described embodiments, video data corresponding to one video reproduction table is composed of one or more sets of sectional video data that are arranged consecutively. Visual effects such as wipes may be used between such sets of sectional video data by providing a means for giving such visual effects to a video receiving/reproducing apparatus. For the present invention, it is also possible to divide one video program into a plurality of sets of sectional video data, and to generate, for this video program, a video reproduction table so as to have a commercial reproduced between these sets of sectional video data. When this video program is a fee-based content, a sponsor of this commercial may pay a fee for the video program, instead of a viewer.

A video reproduction table may be sent via a digital broadcast wave or a packaged medium such as a DVD even though the above-described embodiments state that the video reproduction table is sent via the Internet.

Although the present invention has been fully described by way of examples with reference to the accompanying drawings, it is to be noted that various changes and modifications will be apparent to those skilled in the art. Therefore, unless such changes and modifications depart from the scope of the present invention, they should be construed as being included therein.

What is claimed is:

1. A video receiving/reproducing apparatus that is connected to at least one video file providing apparatus via the Internet, each of the at least one video file providing apparatus being operable to store at least one mixed file which stores a video data sequence containing a plurality of sets of sectional video data that are arranged consecutively, and a plurality of video reproduction tables that each contain reproduction information specifying at least one set of sectional video data in an order of reproduction of each set of sectional video data, and to transmit a mixed file via the Internet, said video receiving/reproducing apparatus comprising:

a mixed file requesting unit operable to transmit a request for a mixed file to one of the at least one video file providing apparatus;

a mixed file receiving unit operable to receive the mixed file, for which the request has been made, from the one of the at least one video file providing apparatus via the Internet, each set of sectional video data in the received mixed file being encrypted;

a table generating unit operable to analyze the received mixed file, and generate a video reproduction table, which additionally shows a total reproduction fee for all sets of sectional video data specified in the generated video reproduction table, and reproduction information which contains at least one encrypted data key which is used to decrypt each set of encrypted sectional video data in the video reproduction table;

a video data reading unit operable to analyze a mixed file, which has been received by said mixed file receiving unit, and to read a set of encrypted sectional video data from the analyzed mixed file, the read set of encrypted sectional video data corresponding to an earliest order of reproduction that is shown in the reproduction information;

a charging unit operable to store a decryption key for decrypting each encrypted data key, to receive the generated video reproduction table, to charge the reproduction fee, and to send the stored decryption key;

a video data decrypting unit operable to receive the decryption key sent from said charging unit, to decrypt the encrypted data key by using the decryption key so as to generate a decrypted data key, and to decrypt the read set of encrypted sectional video data by using the decrypted data key so as to generate a set of decrypted sectional video data; and a reproducing unit operable to reproduce and output the set of decrypted sectional video data generated by said video data decrypting unit.

2. The video receiving/reproducing apparatus of claim 1, wherein the generated video reproduction table additionally contains an identifier that identifies a manufacturer of an authoring tool which is used to generate the received mixed file, and at least one of a share and a formula which is used to calculate the share to be distributed, out of the reproduction fee, to the identified manufacturer;

wherein said charging unit includes a share calculating unit operable to calculate the share according to the formula when the formula is contained in the video reproduction table, and to store the share with the identifier; and wherein a fee equal which is to the reproduction fee minus the share is paid to at least one of an organization and a person, the organization and the person including a producer of the received mixed file.

3. The video receiving/reproducing apparatus of claim 1,
wherein the generated video reproduction table additionally contains an identifier that identifies a manufacturer of an authoring tool which is used to generate the received mixed file, and a percentage of a share to be distributed, out of the reproduction fee, to the identified manufacturer; and wherein the charging unit includes a share calculating unit operable to multiply the reproduction fee by the percentage so as to calculate the share, and to store the calculated share with the identifier, wherein a fee which is equal to the reproduction fee minus the share is paid to a producer of the received mixed file.

* * * * *